US012764317B2

(12) United States Patent
Kato et al.

(10) Patent No.: US 12,764,317 B2
(45) Date of Patent: Oct. 13, 2026

(54) IMAGE DECODING DEVICE, IMAGE DECODING METHOD, AND PROGRAM

(71) Applicant: KDDI CORPORATION, Tokyo (JP)

(72) Inventors: Haruhisa Kato, Fujimino (JP); Yoshitaka Kidani, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 19/061,088

(22) Filed: Feb. 24, 2025

(65) Prior Publication Data

US 2025/0227276 A1 Jul. 10, 2025

Related U.S. Application Data

(63) Continuation of application No. PCT/JP2023/029766, filed on Aug. 17, 2023.

(30) Foreign Application Priority Data

Oct. 13, 2022 (JP) ................................ 2022-165082

(51) Int. Cl.
*H04N 19/44* (2014.01)
*H04N 19/124* (2014.01)
(Continued)

(52) U.S. Cl.
CPC ........... *H04N 19/44* (2014.11); *H04N 19/124* (2014.11); *H04N 19/18* (2014.11); *H04N 19/182* (2014.11); *H04N 19/619* (2014.11)

(58) Field of Classification Search
CPC ...... H04N 19/44; H04N 19/124; H04N 19/18; H04N 19/182; H04N 19/619;
(Continued)

(56) References Cited

U.S. PATENT DOCUMENTS

2011/0200111 A1* 8/2011 Chen .................... H04N 19/137
375/240.16
2013/0089265 A1 4/2013 Yie et al.
(Continued)

FOREIGN PATENT DOCUMENTS

JP 2021129148 A 9/2021
JP 2022506152 A * 1/2022 ........... H04N 19/196

OTHER PUBLICATIONS

International Search Report (ISR) (and English language translation thereof) dated Oct. 17, 2023, issued in International Application No. PCT/JP2023/029766.

(Continued)

*Primary Examiner* — Jared Walker
(74) *Attorney, Agent, or Firm* — Holtz, Holtz & Volek PC

(57) ABSTRACT

An image decoding device 200 according to the present invention includes a circuit, wherein the circuit: generates a first prediction pixel based on a decoded pixel and a control information; generates a second prediction pixel based on an accumulated decoded pixel and the control information; synthesizes an arbitrary combination including at least one of the first predicted pixel and the second predicted pixel with each of small regions divided by a plurality of line segments on a basis of the control information to obtain a third predicted pixel; and adds one of the first predicted pixel, the second predicted pixel, and the third predicted pixel and the prediction residual to obtain the decoded pixel.

31 Claims, 20 Drawing Sheets

(51) Int. Cl.
*H04N 19/18* (2014.01)
*H04N 19/182* (2014.01)
*H04N 19/61* (2014.01)

(58) Field of Classification Search
CPC .... H04N 19/105; H04N 19/11; H04N 19/119; H04N 19/14; H04N 19/176; H04N 19/593; H04N 19/70
See application file for complete search history.

(56) References Cited

U.S. PATENT DOCUMENTS

| | | | | |
|---|---|---|---|---|
| 2014/0192876 | A1* | 7/2014 | Yie | H04N 19/176 375/240.12 |
| 2014/0247872 | A1* | 9/2014 | Merkle | H04N 19/105 375/240.12 |
| 2015/0326866 | A1* | 11/2015 | Ikai | H04N 19/174 375/240.25 |
| 2016/0212446 | A1* | 7/2016 | Liu | H04N 19/11 |
| 2017/0374369 | A1* | 12/2017 | Chuang | H04N 19/70 |
| 2018/0184108 | A1* | 6/2018 | Zhang | H04N 19/567 |
| 2021/0006790 | A1 | 1/2021 | Zhang et al. | |
| 2021/0185354 | A1* | 6/2021 | Kidani | H04N 19/136 |
| 2021/0266603 | A1* | 8/2021 | Filippov | H04N 19/593 |
| 2021/0344929 | A1* | 11/2021 | Choi | H04N 19/11 |
| 2022/0094909 | A1* | 3/2022 | Hannuksela | H04N 19/172 |
| 2022/0132120 | A1* | 4/2022 | Zhang | H04N 19/176 |
| 2022/0182644 | A1* | 6/2022 | Sjöberg | H04N 19/174 |
| 2022/0182646 | A1* | 6/2022 | Iwamura | H04N 19/91 |
| 2022/0210413 | A1* | 6/2022 | Zeng | H04N 19/147 |

OTHER PUBLICATIONS

"Versatile Video Coding", ITU-T H.266.

Written Opinion dated Oct. 17, 2023, issued in International Application No. PCT/JP2023/029766.

Coban, Muhammed, "Algorithm Description of Enhanced Compression Model 5 (ECM5)", JVET-Z2025.

Coban, et al., "Algorithm description of Enhanced Compression Model 6 (ECM 6)", JVET-AA2025, Oct. 11, 2022. pp. 29-30.

Kidani, et al., "EE2-2.7: GPM Adaptive Blending (JVET-Z0059, JVET-Z0137)", JVET-AA0058-v3.

* cited by examiner

32 PATTERNS DIVIDED INTO 2 RECTANGULAR REGIONS

DECODING TARGET BLOCK

DECODING TARGET BLOCK

FIG. 14

| ANGLE OF GPM PARTITION LINE | 0 | 2 | 3 | 4 | 5 | 8 | 11 | 12 | 13 | 14 |
|---|---|---|---|---|---|---|---|---|---|---|
| PARTITION REGION A | A | A | A | A | L+A | L+A | L+A | L+A | A | A |
| PARTITION REGION B | L+A | L+A | L+A | L | L | L | L | L+A | L+A | L+A |
| ANGLE OF GPM PARTITION LINE | 16 | 18 | 19 | 20 | 21 | 24 | 27 | 28 | 29 | 30 |
| PARTITION REGION A | A | A | A | A | L+A | L+A | L+A | L+A | A | A |
| PARTITION REGION B | L+A | L+A | L+A | L | L | L | L | L+A | L+A | L+A |

| | | | | | | | | |
|---|---|---|---|---|---|---|---|---|
| cu_div_idx | 0 | 1 | 2 | 3 | 4 | 5 | 6 | 7 |
| divDirectionIdx | 0 | 1 | 2 | 3 | 0 | 1 | 2 | 3 |
| divLocationIdx | 0 | 0 | 0 | 0 | 1 | 1 | 1 | 1 |
| cu_div_idx | 8 | 9 | 10 | 11 | 12 | 13 | 14 | 15 |
| divDirectionIdx | 0 | 1 | 2 | 3 | 0 | 1 | 2 | 3 |
| divLocationIdx | 2 | 2 | 2 | 2 | 3 | 3 | 3 | 3 |
| cu_div_idx | 16 | 17 | 18 | 19 | 20 | 21 | 22 | 23 |
| divDirectionIdx | 0 | 1 | 2 | 3 | 0 | 1 | 2 | 3 |
| divLocationIdx | 4 | 4 | 4 | 4 | 5 | 5 | 5 | 5 |
| cu_div_idx | 24 | 25 | 26 | 27 | 28 | 29 | 30 | 31 |
| divDirectionIdx | 0 | 1 | 2 | 3 | 0 | 1 | 2 | 3 |
| divLocationIdx | 6 | 6 | 6 | 6 | 7 | 7 | 7 | 7 |

32 PATTERNS DIVIDED INTO 2 RECTANGULAR REGIONS

IMAGE DECODING DEVICE, IMAGE DECODING METHOD, AND PROGRAM

CROSS-REFERENCE TO RELATED APPLICATIONS

The present application is a continuation of PCT Application No. PCT/JP2023/029766, filed on Aug. 17, 2023, which claims the benefit of Japanese patent application No. 2022-165082 filed on Oct. 13, 2022, the entire contents of each application being incorporated herein by reference in its entirety.

TECHNICAL FIELD

The present invention relates to an image decoding device, an image decoding method, and a program.

BACKGROUND ART

Non Patent Literatures 1: "ITU-T H. 266/VVC"; 2: "Algorithm description of Enhanced Compression Model 5 (ECM 5)"; and 3: "EE2-2.7: GPM adaptive blending (JVET-Z0059, JVET-Z0137), JVET-AA0058" disclose a geometric partitioning mode (GPM). The GPM divides a rectangular block into two by oblique partition lines, and performs motion compensation (inter prediction) or intra prediction on each of the two divided small regions.

Specifically, in the GPM, a motion compensation (inter prediction) pixel and an intra prediction pixel according to a motion vector or an intra prediction mode of each of the divided small regions are generated, and then the two predicted pixels are synthesized by a weighted average according to a distance from the partition line.

SUMMARY OF THE INVENTION

The method for dividing a rectangular block by the geometric partitioning mode of Non Patent Literature 1 and Non Patent Literature 2 is defined by one straight line, and 64 kinds of division methods are set in advance by a combination of different angles and positions.

For example, in a case where the boundary between the foreground and the background is included in the decoding target block, if the boundary is one straight line, the decoding target block can be separated into two small regions, and the high-efficiency coding can be performed using the prediction scheme suitable for each boundary.

However, in a case where the boundary is not one straight line, there is a problem that there is room for improvement in encoding performance. Thus, the present invention has been made in view of the above-described problem, and an object thereof is to provide an image decoding device, an image decoding method, and a program having high encoding efficiency.

The first aspect of the present invention is summarized as an image decoding device including a circuit, wherein the circuit: decodes control information and a quantized value; performs inverse quantization on the quantized value to obtain a transformation coefficient; performs inverse transformation on the transformation coefficient to obtain a prediction residual; generates a first prediction pixel based on a decoded pixel and the control information; accumulates the decoded pixel; generates a second prediction pixel based on the accumulated decoded pixel and the control information; synthesizes an arbitrary combination including at least one of the first predicted pixel and the second predicted pixel with each of small regions divided by a plurality of line segments on a basis of the control information to obtain a third predicted pixel; and adds one of the first predicted pixel, the second predicted pixel, and the third predicted pixel and the prediction residual to obtain the decoded pixel.

The second aspect of the present invention is summarized as an image decoding method including: decoding control information and a quantized value; performing inverse quantization on the quantized value to obtain a transformation coefficient; performing inverse transformation on the transformation coefficient to obtain a prediction residual; generating a first prediction pixel based on a decoded pixel and the control information; accumulating the decoded pixel; generating a second prediction pixel based on the accumulated decoded pixel and the control information; synthesizing an arbitrary combination including at least one of the first predicted pixel and the second predicted pixel with each of small regions divided by a plurality of line segments on a basis of the control information to obtain a third predicted pixel; and adding one of the first predicted pixel, the second predicted pixel, and the third predicted pixel and the prediction residual to obtain the decoded pixel.

The third aspect of the present invention is summarized as a program stored on a non-transitory computer-readable medium causing a computer to function as an image decoding device including a circuit, wherein the circuit: decodes control information and a quantized value; performs inverse quantization on the quantized value to obtain a transformation coefficient; performs inverse transformation on the transformation coefficient to obtain a prediction residual; an intra prediction unit that generates a first prediction pixel based on a decoded pixel and the control information; accumulates the decoded pixel; generates a second prediction pixel based on the accumulated decoded pixel and the control information; synthesizes an arbitrary combination including at least one of the first predicted pixel and the second predicted pixel with each of small regions divided by a plurality of line segments on a basis of the control information to obtain a third predicted pixel; and adds one of the first predicted pixel, the second predicted pixel, and the third predicted pixel and the prediction residual to obtain the decoded pixel.

According to the present invention, it is possible to provide an image decoding device, an image decoding method, and a program having high encoding efficiency.

BRIEF DESCRIPTION OF THE DRAWINGS

FIG. 14 is a diagram for explaining the intra prediction mode derivation method according to the present embodiment.

DESCRIPTION OF EMBODIMENTS

An embodiment of the present invention will be described hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

First Embodiment

Figure 1:
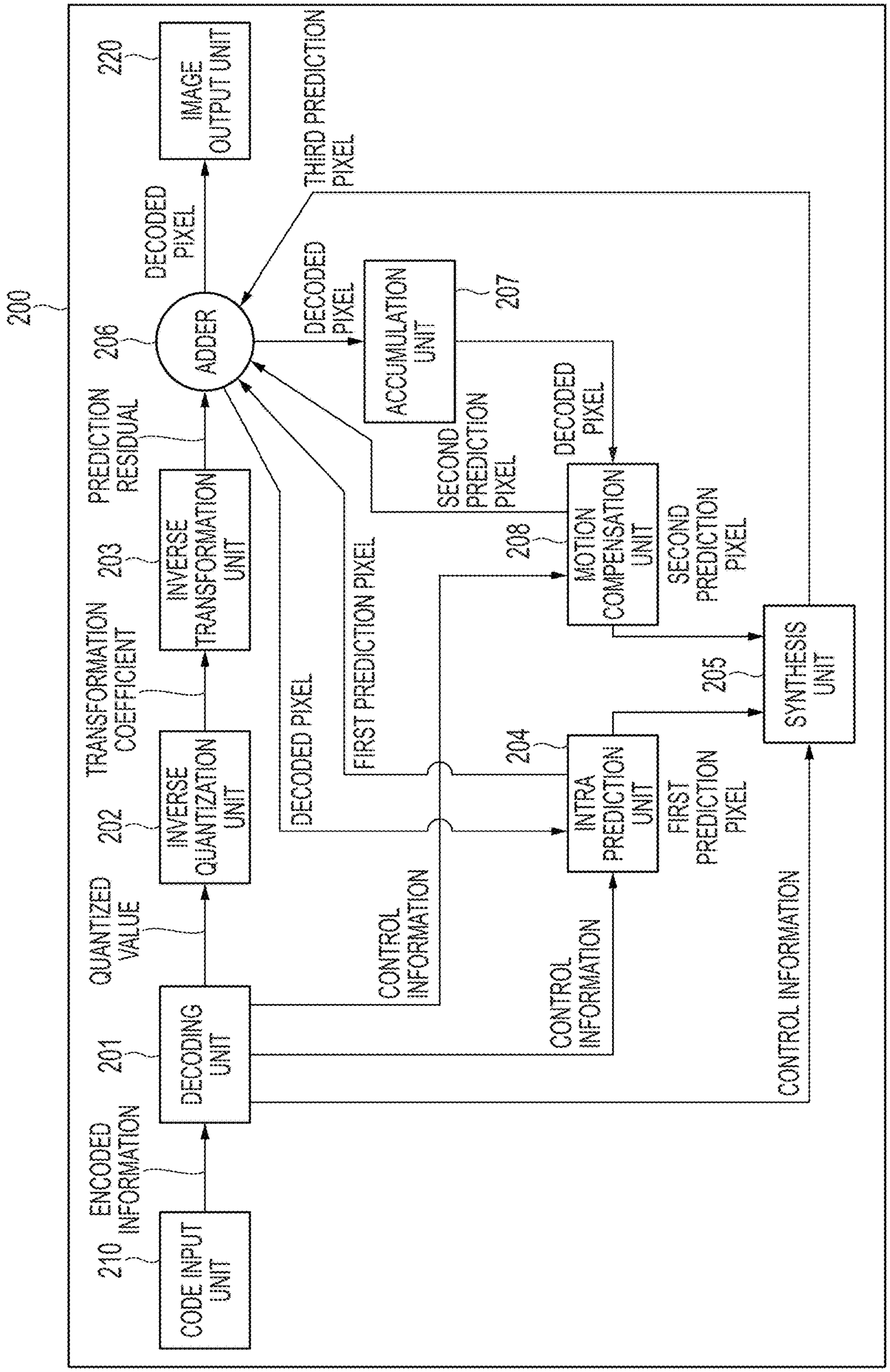
FIG. 1 is a diagram illustrating an example of functional blocks of an image decoding device 200 according to an embodiment.

Hereinafter, the image decoding device 200 according to the present embodiment will be described with reference to FIGS. 1 to 18. FIG. 1 is a diagram illustrating an example of functional blocks of an image decoding device 200 according to the present embodiment.

As illustrated in FIG. 1, the image decoding device 200 includes a code input unit 210, a decoding unit 201, an inverse quantization unit 202, an inverse transformation unit 203, an intra prediction unit 204, a synthesis unit 205, an adder 206, an accumulation unit 207, a motion compensation unit 208, and an image output unit 220.

The code input unit 210 is configured to acquire encoded information which is encoded by an image encoding device.

The decoding unit 201 is configured to decode control information and a quantized value from the encoded information which is input from the code input unit 210. For example, the decoding unit 201 is configured to output control information and a quantized value by performing variable length decoding on the encoded information.

Here, the quantized value is transmitted to the inverse quantization unit 202, and the control information is transmitted to the intra prediction unit 204, the synthesis unit 205, and the motion compensation unit 208. Note that the control information includes information required for control of the intra prediction unit 204, the synthesis unit 205, the motion compensation unit 208, and the like, and may include header information such as a sequence parameter set, a picture parameter set, a picture header, or a slice header.

The inverse quantization unit 202 is configured to obtain a decoded transformation coefficient by performing inverse quantization on the quantized value transmitted from the decoding unit 201. The transformation coefficient is transmitted to the inverse transformation unit 203.

The inverse transformation unit 203 is configured to obtain a decoded prediction residual by performing inverse transformation on the transformation coefficient transmitted from the inverse quantization unit 202. The prediction residual is transmitted to the adder 206.

The intra prediction unit 204 is configured to generate a first predicted pixel based on a decoded pixel and the control information transmitted from the decoding unit 201. Here, the decoded pixel is obtained via the adder 206, and is accumulated in the accumulation unit 207. Note that the first predicted pixel is transmitted to the adder 206.

The accumulation unit 207 is configured to cumulatively accumulate the decoded pixels transmitted from the adder 206. The decoded pixel is referred to from the motion compensation unit 208 via the accumulation unit 207.

The motion compensation unit 208 is configured to generate a second predicted pixel to be added to the prediction residual by the adder 206 on the basis of the decoded pixel obtained by referring to the accumulation unit 207 and the control information decoded by the decoding unit 201. The generated second predicted pixel is transmitted to the adder 206 or the synthesis unit 205.

The adder 206 is configured to add one of the first to third predicted pixels generated from the decoded pixels or the like and the prediction residual transmitted from the inverse transformation unit 203 to obtain a decoded pixel. The decoded pixel is transmitted to the image output unit 220, the accumulation unit 207, and the intra prediction unit 204.

The synthesis unit 205 is configured to synthesize any combination including at least one of the first predicted pixel and the second predicted pixel described above into each of small regions divided by a plurality of line segments on the basis of the control information decoded by the decoding unit 201 to obtain a third predicted pixel.

Hereinafter, the synthesis unit 205 which is a characteristic configuration of the image decoding device 200 according to the present embodiment will be described.

A role of the synthesis unit 205 is to divide a decoding target block into a plurality of small regions (small region partition) so that a prediction residual can be expressed by a small code amount when a decoded pixel is calculated by the adder 206 in the subsequent stage, and synthesize (synthesize and predict) the first predicted pixel or the second predicted pixel corresponding to each of the small regions to predict a pixel of the decoding target block with high accuracy.

Figure 2:
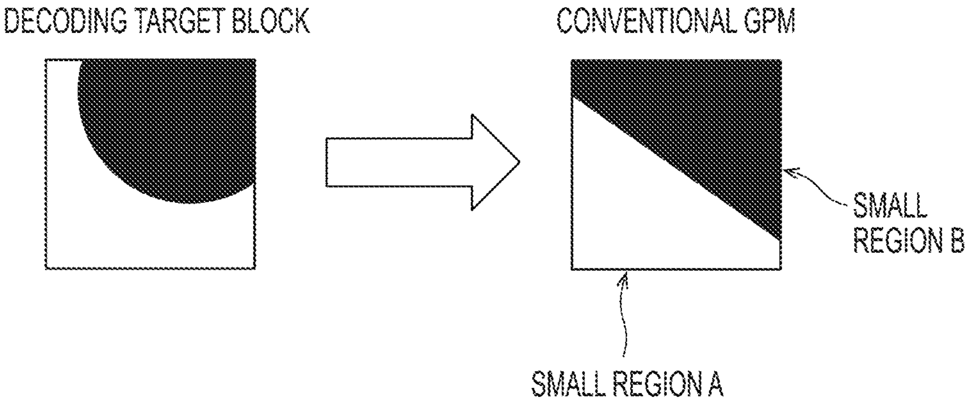
FIG. 2 is a diagram illustrating an example of a case where a geometric partitioning mode (GPM) is used as small region partition.

FIG. 2 illustrates an example of a case where a geometric partitioning mode (GPM) is used as the small region partition. In the example of FIG. 2, the decoding target block is divided into a small region A and a small region B by one oblique straight line.

However, in the geometric partitioning mode, since the division is limited to one straight line, there is a problem that it is not possible to cope with a case where the boundary between the foreground and the background is complicated, and the encoding efficiency cannot be sufficiently improved.

(Basic Concept of Multiple Line Segment Partitioning Mode)

In order to solve such a problem, the image decoding device 200 according to the present embodiment takes a procedure in which the synthesis unit 205 divides a decoding target block into N (N is a natural number greater than 1) line segments.

Figure 3:
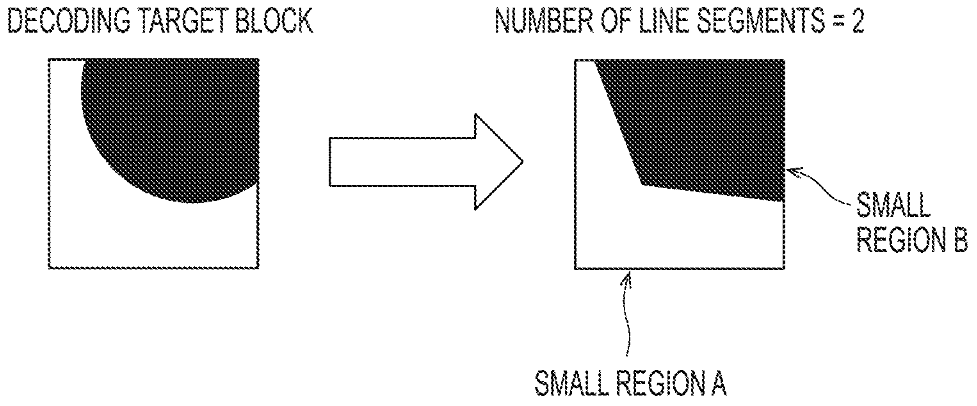
FIG. 3 is a diagram illustrating an example of a case where a decoding target block is divided by N=2 line segments.
Figure 4:
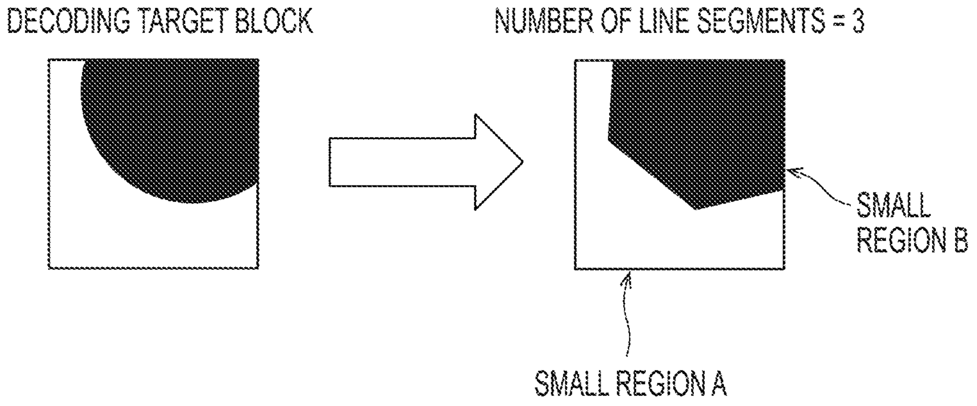
FIG. 4 is a diagram illustrating an example of a case where a decoding target block is divided by N=3 line segments.

For example, FIG. 3 illustrates an example of a case where a decoding target block is divided by N=2 line segments, and FIG. 4 illustrates an example of a case where a decoding target block is divided by N=3 line segments.

Hereinafter, such small region partition and synthesis prediction of the decoding target block by a plurality of (N) line segments will be referred to as a "multiple line segment partitioning mode".

The synthesis unit 205 may determine the partition type of the multiple line segment partitioning mode with the control information. Details will be described later.

An effect of improving the prediction accuracy can be obtained by increasing the number N of line segments in the multiple line segment partitioning mode, and an effect of suppressing the code amount of the control information expressing the partitioned shape can be obtained by decreasing the number N of line segments in the multiple line segment partitioning mode.

The synthesis unit 205 may set the number N of line segments in the multiple line segment partitioning mode to a fixed value. For example, as described above, the synthesis unit 205 may set N=2, N=3, N=4, N=5, and the like.

The synthesis unit 205 may set a fixed value to the common value regardless of the length of the short side, the length of the long side, the size (area), or the aspect ratio of the decoding target block.

Alternatively, the synthesis unit 205 may set such fixed values to different values on the basis of the length of the short side, the length of the long side, the size (area), or the aspect ratio of the decoding target block.

Furthermore, the synthesis unit 205 may variably set the number N of line segments in the multiple line segment partitioning mode. For example, in a case where the number N of line segments in the multiple line segment partitioning mode is set to be variable, the synthesis unit 205 may determine the number N of line segments in proportion to the length of the short side, the length of the long side, and the size (area) of the decoding target block.

Furthermore, the synthesis unit 205 may limit at least one of the positional relationship and the angle of the plurality of line segments in order to suppress the code amount of the control information expressing the partitioned shape.

For example, the synthesis unit 205 may limit the first line segment to only the horizontal direction (0 degrees) or the vertical direction (90 degrees) of the decoding target block. Furthermore, the synthesis unit 205 may limit the (n+1)th line segment to only the vertical direction (90 degrees) with respect to the nth line segment.

However, since the partitioned shape that divides the decoding target block into four equal parts can be realized by recursive rectangular block division (quadtree/binary tree/ternary tree division) disclosed in Non Patent Literature 1, it is desirable that the synthesis unit 205 be limited so as not to be able to select the arrangement that can be realized by the existing block division.

Figure 5:
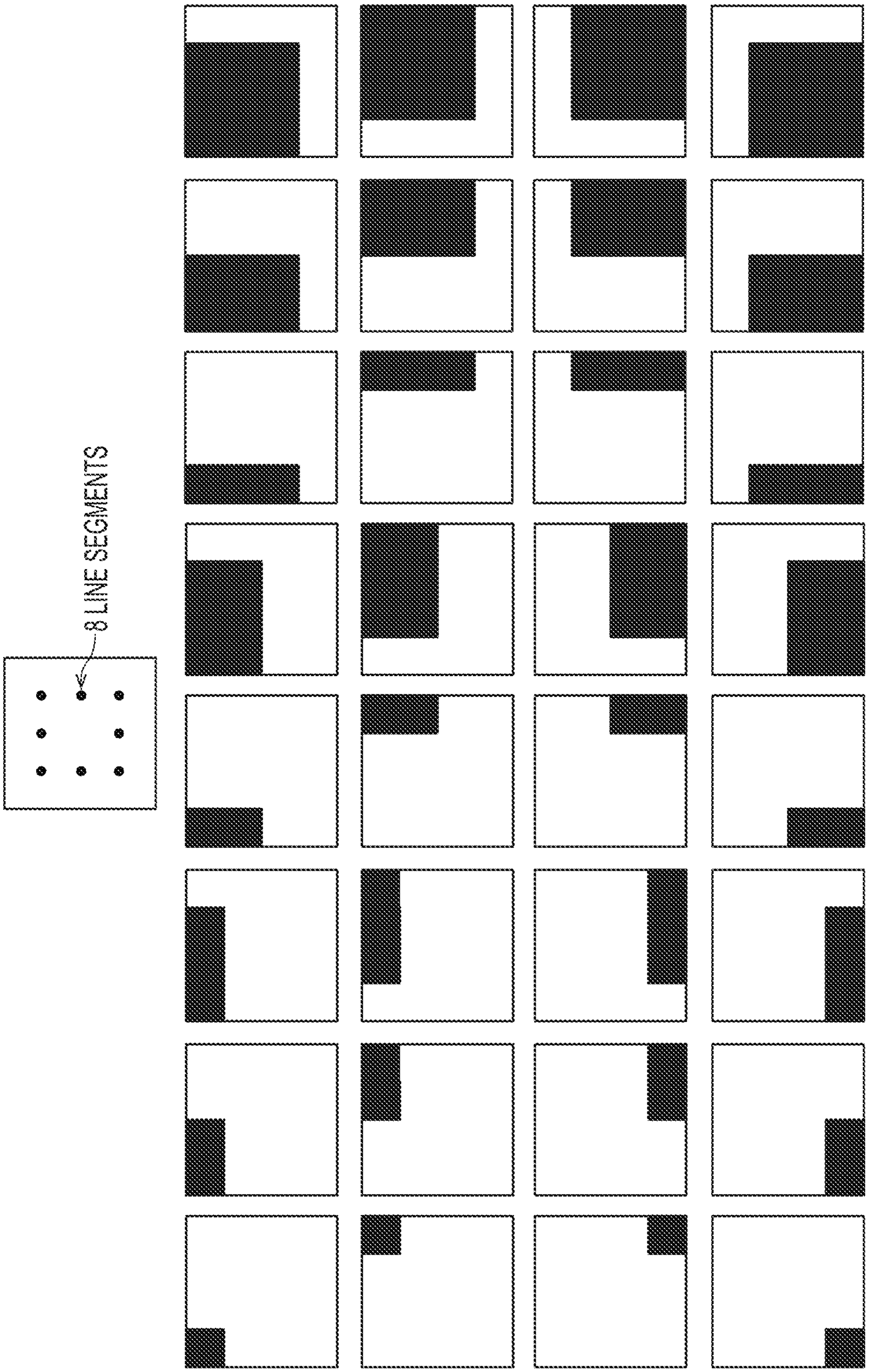
FIG. 5 is a diagram illustrating an example of a partitioned shape of a selectable decoding target block.

Applying such a limitation corresponds to, for example, in a case where the number of line segments in the multiple line segment partitioning mode is N=2, selecting the partitioned shape (a plurality of line segments) of the decoding target block from among the patterns (32 patterns) divided in the horizontal direction and the vertical direction at the plurality of partition points illustrated in FIG. 5.

Figure 6:
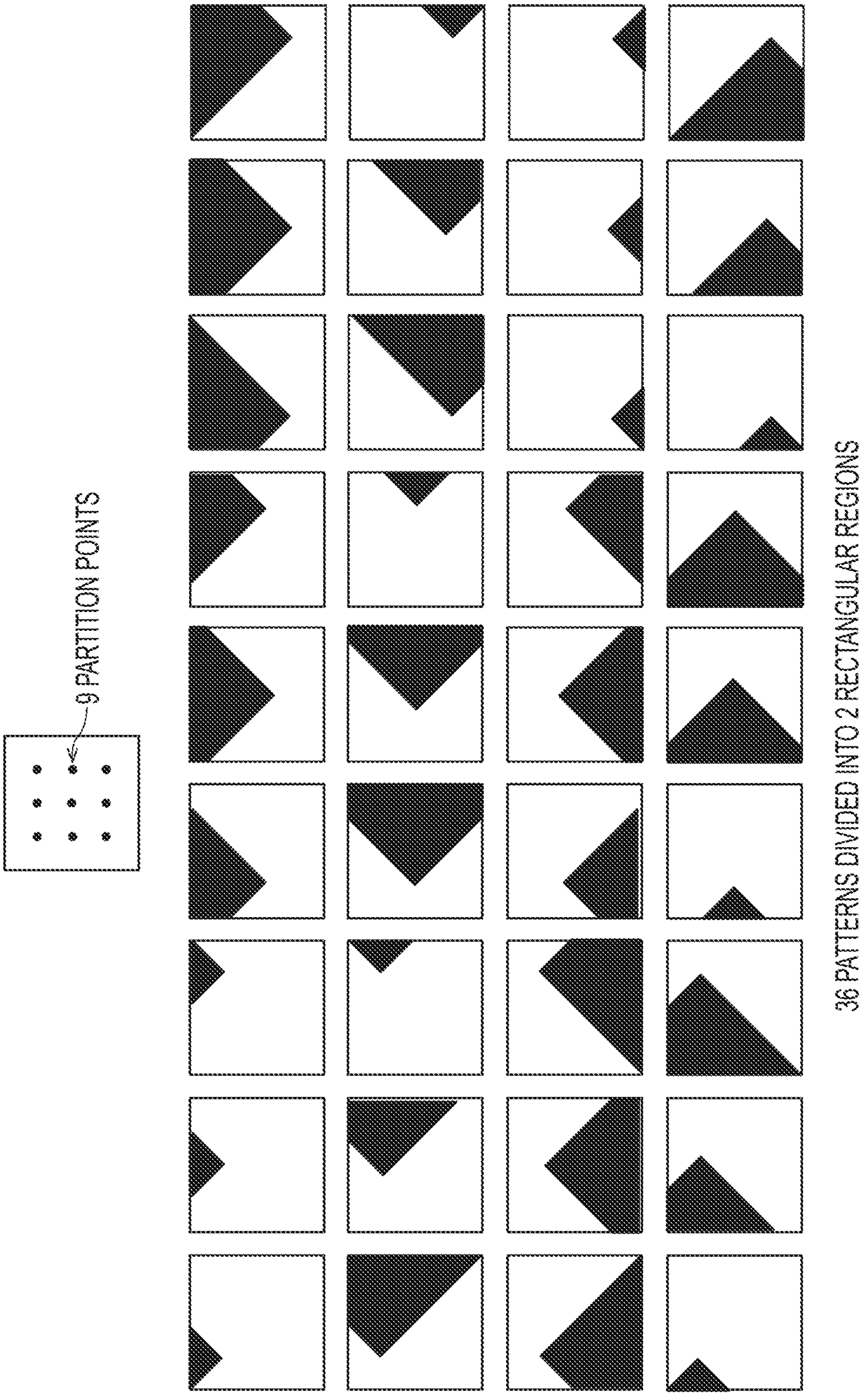
FIG. 6 is a diagram illustrating an example of a partitioned shape of a selectable decoding target block.

Alternatively, in a case where the first line segment can be in an oblique direction (45 degrees) in addition to the horizontal direction (0 degrees) and the vertical direction (90 degrees), applying such limitation corresponds to selecting the partitioned shape (a plurality of line segments) of the decoding target block from among the patterns illustrated in FIG. 5 and the patterns divided in the oblique direction illustrated in FIG. 6.

Here, an effect of improving the prediction accuracy can be obtained by reducing the above-described limitation, and an effect of reducing the code amount of the control information expressing the partitioned shape can be obtained by increasing the above-described limitation.

The synthesis unit 205 can fixedly set or variably set the above-described limitation method.

Furthermore, the synthesis unit 205 can set different limitations according to the size (length of short side, length of long side, size (area), aspect ratio, and the like) of the decoding target block.

For example, when the partition points illustrated in FIG. 5 are arranged for each fixed number of pixels, the number of partition points is proportional to the length of the side of the decoding target block.

Conversely, by changing the arrangement of the partition points, the synthesis unit 205 can fixedly set the number of partition points without depending on the size of the decoding target block.

For example, in a case where the number of K (K is a natural number) partition points is fixedly arranged in the longitudinal direction or the lateral direction of the decoding target block, the synthesis unit 205 may arrange the partition points for each L/(K+1) pixel as a ratio between the length L (L is a natural number) of the side of the decoding target block and the pixel.

Here, L may be a natural number of a power of 2 of 4 or more, such as 4, 8, 16, 32, 64, or 128 as in Non Patent Literature 1. Similarly, K may also be a natural number of a power of 2 of 4 or more, such as 4, 8, 16, 32, 64, or 128.

Furthermore, the possible value of K may be limited such that the L/(K+1) pixel is a natural number of a power of 2 of 4 or more, such as 4, 8, 16, 32, 64, or 128.

Furthermore, in a case where the aspect ratios of the decoding target blocks are different, the synthesis unit 205 may set different K partition points for the longitudinal and lateral sides (longitudinal and lateral widths) of the decoding target blocks.

Further, the synthesis unit 205 may include the center of the decoding target block in FIG. 5 in the partition point.

An effect of improving the prediction accuracy can be obtained by increasing the number of partition points, and an effect of reducing the code amount expressing the partitioned shape can be obtained by reducing the number of partition points.

(Method for Generating Third Predicted Pixel in Multiple Line Segment Partitioning Mode)

Hereinafter, a method for generating the third predicted pixel by the synthesis unit 205 in the multiple line segment partitioning mode will be described.

The synthesis unit 205 is configured to perform weighted averaging (that is, the synthesis prediction) on each predicted pixel for the small region A and the small region B of the decoding target block divided into a plurality of line segments according to the distance of the partition line.

The types of predicted pixels in the small region A and the small region B may be a combination of different inter predicted pixels like the geometric partitioning mode disclosed in Non Patent Literature 1, a combination of an inter predicted pixel and an intra prediction pixel like the geometric partitioning mode intra prediction disclosed in Non Patent Literature 2, or a combination of different intra prediction pixels.

Here, different inter predicted pixels are generated based on different motion vectors, and different intra prediction pixels are generated in different intra prediction modes.

For the synthesis prediction of the small region A and the small region B by the synthesis unit 205, the weighted averaging according to the distance from the partition line as used for the synthesis prediction of the geometric partitioning mode disclosed in Non Patent Literature 1 or Non Patent Literature 3 can be used.

A total value of the weighting factors for the plurality of predicted pixels is designed to be 1 for each pixel, and a result obtained by synthesizing the plurality of predicted pixels by weighted averaging using the weighting factors is set as a predicted pixel by the synthesis unit 205.

Here, the pixel having the weighting factor of 1 (that is, the maximum value) is adopted as the input predicted pixel, and the pixel having the weighting factor of 0 (that is, the minimum value) is not used as the input predicted pixel. Thus, conceptually, this operation corresponds to dividing a unit block into a plurality of small regions, and determines which pixel of the plurality of input predicted pixels is applied at which ratio and where.

Figure 7:
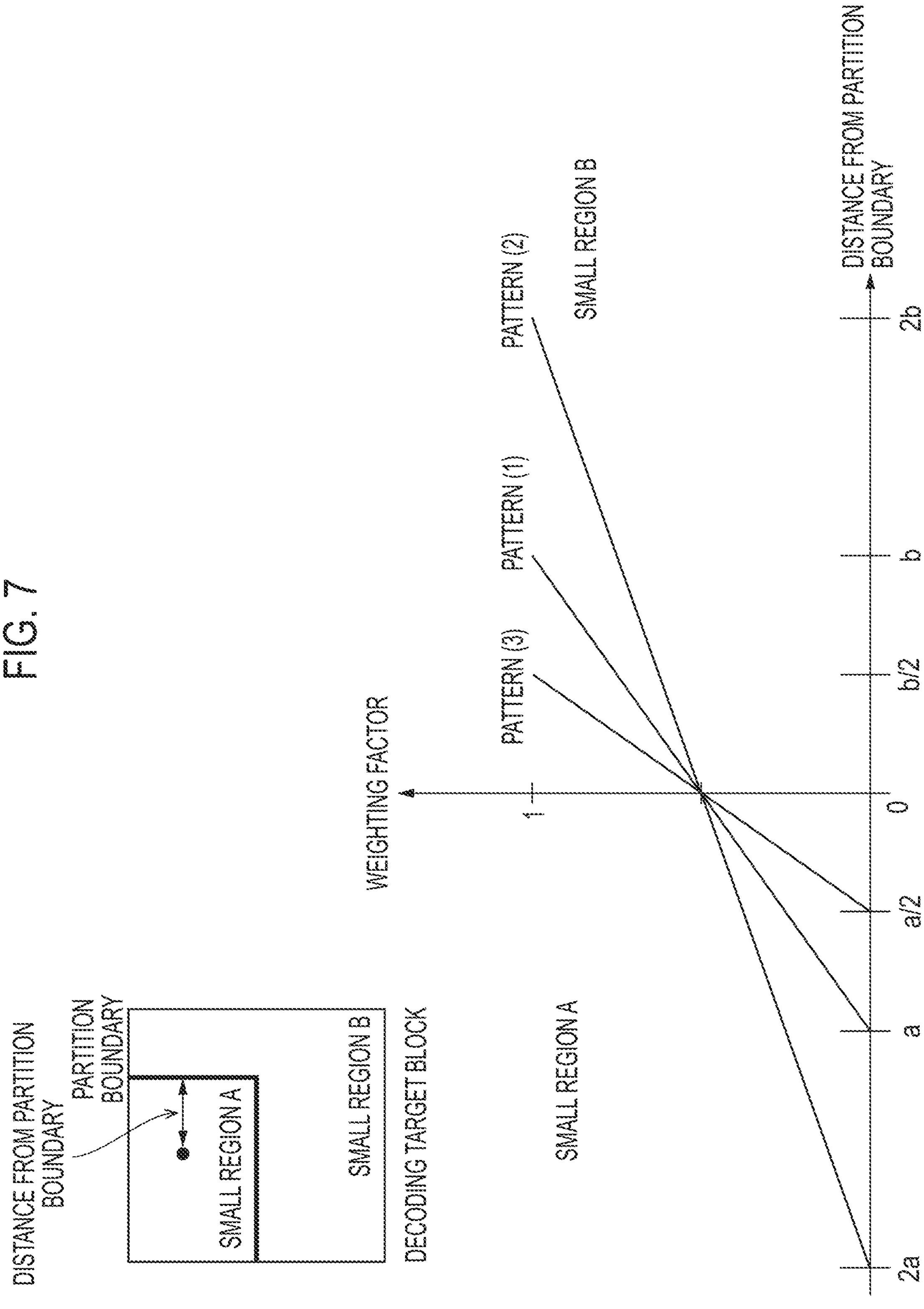
FIG. 7 is a diagram illustrating an example of three patterns of weighting factors allocated to the partition boundary of a small region B illustrated in FIG. 2.

FIG. 7 illustrates an example of three patterns of weighting factors allocated to the partition boundary of the small region B illustrated in FIG. 2. In the example of FIG. 7, a lateral axis represents a distance in units of pixels from a position of the partition boundary (partition line), and a longitudinal axis represents the weighting factor.

Specifically, there are prepared a pattern (1) in which a weighting factor [0, 1] is allocated to a range of [a, b] for the distances a and b in units of predicted pixels from a position of the partition boundary which is set in advance, a pattern (2) in which a weighting factor [0, 1] is similarly allocated to a range of [2a, 2b] obtained by respectively doubling the distances a and b, and a pattern (3) in which a weighting factor [0, 1] is similarly allocated to a range of [a/2, b/2] obtained by respectively multiplying the distances a and b by ½.

In a case where the weighting factor is defined as xc, yc which is uniquely determined by a distance d (xc, yc) from the partition boundary (partition line), preparing the patterns is equivalent to preparing a plurality of patterns (variable values), instead of a limited pattern (fixed value), for the width of the partition boundary of the small regions disclosed in Non Patent Literature 3, that is, the width t when the weighting factor has a value other than a minimum value or a maximum value.

Here, xc, yc is a coordinate in the decoding target block. That is, the synthesis unit 205 may be configured to set a plurality of weighting factors according to the inter-pixel distance from the partition boundary.

Note that, when a=b, symmetrical weighting factors with respect to the partition boundary may be set. That is, the synthesis unit 205 may be configured to set, as the weighting factors, symmetrical weighting factors with respect to the partition boundary. According to the configuration, b is unnecessary, and thus a code amount can be reduced.

In addition, when a≠b, asymmetrical weighting factors with respect to the partition boundary may be set. That is, the synthesis unit 205 may be configured to set, as the weighting factors, asymmetrical weighting factors with respect to the partition boundary. According to the configuration, in a case where there are different blurring states on both sides of the boundary, it is possible to perform prediction with high accuracy.

In addition, the number is not limited to the two of a and b, and the weighting factors can be set using a plurality of line segments or the like by increasing the number. That is, the synthesis unit 205 may be configured to set the weighting factors using a plurality of line segments according to the inter-pixel distance from the partition boundary. According to the configuration, it is possible to perform prediction with high accuracy in a case where blurring occurs in a nonlinear manner.

As described above, by setting the plurality of weighting factors according to the inter-pixel distance from the partition boundary, an effect that can be uniformly derived even in various block sizes such as 8×8 and 64×16 can be obtained.

The synthesis unit 205 can arbitrarily set the type, shape, and number of patterns described above.

For example, in the example described above, two times and ½ times the distances a and b have been described as the plurality of patterns. On the other hand, four times and ¼ times the distances may be used. Further, in the above expression, the weighting factor is set to a value of 0 to 8. On the other hand, the weighting factor may be set to another value such as a value of 0 to 16 or a value of 0 to 32. In particular, in a case where the inter-pixel distance from the partition boundary is twice or four times, weighted averaging in units of pixels can be performed with high accuracy by increasing the maximum value of the weighting factor.

The synthesis unit 205 may select the setting of the plurality of weighting factors (width of blending region, maximum value and minimum value of weighting factor) for the small region A and the small region B from among combinations prepared in advance on the basis of the control information transmitted from the decoding unit 201.

For example, as disclosed in Non Patent Literature 3, the synthesis unit 205 may select the above-described weighting factor from a plurality of patterns (in Non Patent Literature 3, five patterns having a width of ¼ times, a width of ½ times, a width of 1 time, a width of 2 times, and a width of 4 times are described) prepared in advance using such control information.

Alternatively, as disclosed in Non Patent Literature 3, the synthesis unit 205 may narrow down selectable candidates from a plurality of pattern candidates prepared in advance according to the size of the decoding target block, the length of the short side, the length of the long side, or the aspect ratio while using the control information, and then select the blending width indicated by the control information.

Here, in the multiple line segment partitioning mode, unlike the synthesis prediction for the geometric partitioning mode disclosed in Non Patent Literatures 1 to 3, since there are a plurality of division boundaries (partition lines) that divide the small region, the synthesis prediction is performed on the plurality of partition lines.

Figure 8:
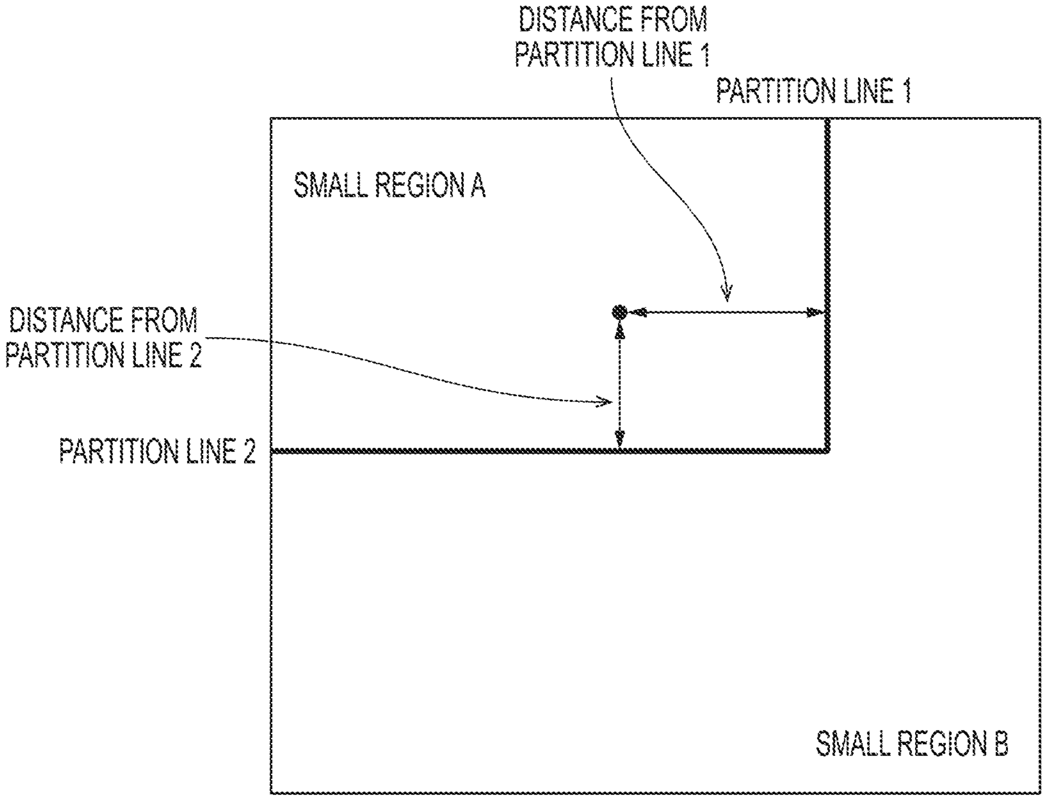
FIG. 8 is a diagram illustrating an example of a case where a partition boundary is configured by two partition lines in a vertical direction and a horizontal direction with respect to a decoding target block, and synthesis prediction is performed in units of predicted pixels according to distances from the two partition lines (partition line 1 and partition line 2).

FIG. 8 illustrates an example of a case where, as illustrated in FIG. 5, a partition boundary is configured by two partition lines in a vertical direction and a horizontal direction with respect to a decoding target block, and synthesis prediction is performed in units of predicted pixels according to distances from the two partition lines (partition line 1 and partition line 2). The synthesis unit 205 may apply a common weighted average to the synthesis prediction for the plurality of partition lines.

Alternatively, the synthesis unit 205 may apply a weighted average including the maximum value of the different weighting factors and the distance from the partition line described above.

Further, the synthesis unit 205 may be configured to select the weighting factor from among the plurality of weighting factors according to at least one of the length of the short side, the length of the long side, the aspect ratio, or the size (the number of pixels) of the decoding target block, and the type of the partitioning mode.

Alternatively, in a case where the intra prediction is applied to the small region A or the small region B, the synthesis unit 205 may be configured to select a weighting factor from among a plurality of weighting factors according to the type of the intra prediction mode.

Alternatively, the synthesis unit 205 may be configured to select a weighting factor from among a plurality of weighting factors according to the size (the number of pixels) of the small region A or the small region B divided in the decoding target block in the multiple line segment partitioning mode.

Alternatively, the synthesis unit 205 may be configured to select a weighting factor from among a plurality of weighting factors according to the size (the number of pixels) of the partition line.

Alternatively, in a case where the direction of the partition line is the horizontal direction or the vertical direction with respect to the decoding target block, the synthesis unit 205 may be configured to select a weighting factor from among a plurality of weighting factors according to the ratio with the side of the decoding target block in the same direction.

Furthermore, in the multiple line segment partitioning mode, due to the nature of a plurality of line segments constituting the partition boundary, there is a case where a region where the weighting factor in the weighted average is the maximum value or the minimum value, that is, a region (blending region) in which a plurality of different predicted pixels are synthesized and predicted overlaps in the vertical direction of each partition line.

Figures 9A, 9B, 9C:
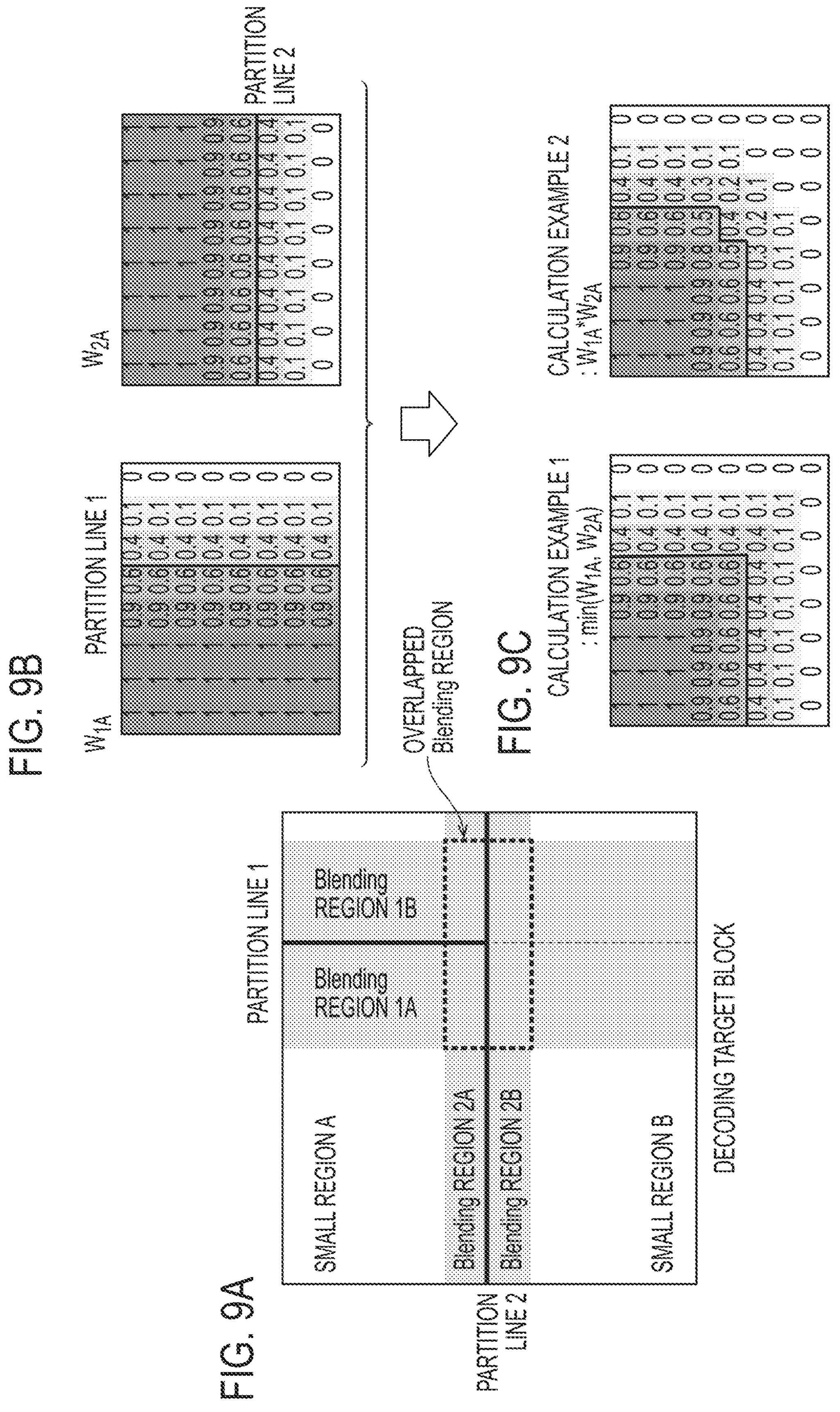
FIGS. 9A, 9B and 9C are diagrams for explaining an example of a blending region for a partition line 1 and a partition line 2.

FIGS. 9A, 9B and 9C are diagrams for explaining an example of a blending region (gray region in FIG. 9A with respect to the partition line 1 and the partition line 2. As illustrated in FIG. 9A, a region (hereinafter, overlapped blending region) where the blending regions with respect to the partition line 1 and the partition line 2 overlap with each other is indicated by a broken-line frame.

Furthermore, FIG. 9B illustrates an example of a weighting factor W_1A applied to the predicted pixel of the small region A with respect to the partition line 1, and an example of a weighting factor W_2A applied to the predicted pixel of the small region A with respect to the partition line 2.

A weighting factor W_1B and a weighting factor W_2B for each of the small regions B take values obtained by subtracting W_1A and W_2A from the maximum value of the weighting factor.

As illustrated in the calculation example 1 of FIG. 9C, the synthesis unit 205 may select the minimum value of the respective elements W_1A and W_2A of the weighting factor and predict and synthesize the third predicted pixels in the blending region and the overlapped blending region using a newly generated weighting factor.

Alternatively, the synthesis unit 205 may calculate the product of the respective elements W_1A and W_2A of the weighting factor and predict and synthesize the third predicted pixels in the blending region and the overlapped blending region using a newly generated weighting factor, as illustrated in the calculation example 2 of FIG. 9C.

(Method for Determining Impossibility of Application of Multiple Line Segment Partitioning Mode and Partition Type)

The control information decoded by the decoding unit 201 will be described below.

The encoded information input to the image decoding device 200 can include a sequence parameter set (SPS) in which sets of control information in units of sequences are collected. In addition, the encoded information can include a picture parameter set (PPS) or a picture header (PH) in which sets of control information in units of pictures are collected. Further, the encoded information may include a slice header (SH) in which sets of control information in units of slices are collected.

An example of an operation of setting the method for selecting the multiple line segment partitioning mode in units of sequences will be described with reference to FIG. 10.

Figure 10:
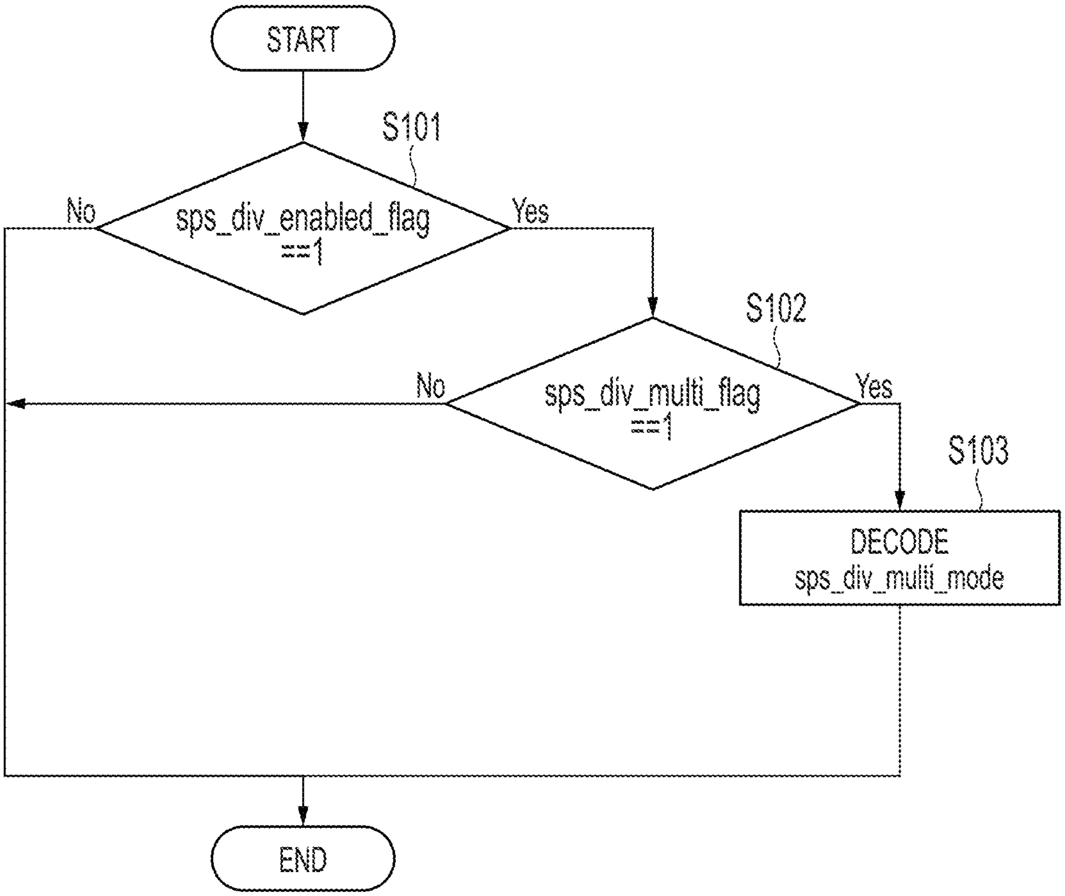
FIG. 10 is a flowchart illustrating an example of an operation of setting the method for selecting a multiple line segment partitioning mode in units of sequences.

As illustrated in FIG. 10, in step S101, the decoding unit 201 determines whether sps_div_enabled_flag is 1 in the sequence parameter set.

Here, sps_div_enabled_flag is syntax for controlling whether the partitioning mode is present. When sps_div_enabled_flag is 1, it indicates that the partitioning mode is enabled, and when sps_div_enabled_flag is 0, it indicates that partitioning mode is disabled.

In a case where sps_div_enabled_flag is 1, the operation proceeds to step S102, and in a case where sps_div_enabled_ flag is 0, the operation ends.

In Step S102, the decoding unit 201 decodes sps_div_multi_flag.

Here, sps_div_multi_flag is syntax for controlling the presence or absence of the multiple line segment partitioning mode, and in a case where sps_div_multi_flag is 1, it indicates that the multiple line segment partitioning mode is valid (N>1), and in a case where sps_div_multi_flag is 0, it indicates that the multiple line segment partitioning mode is invalid (N=1).

In a case where sps_div_multi_flag is 1, the operation proceeds to step S103, and in a case where sps_div_multi_flag is 0, the operation ends.

In step S103, the decoding unit 201 decodes sps_div_multi_mode. Here, sps_div_multi_mode is syntax for controlling the multiple line segment partitioning mode.

By using sps_div_multi_mode, since the setting of the multiple line segment partitioning mode according to the image characteristics can be changed in units of sequences, an effect of maximizing the encoding efficiency can be expected.

For example, since there are many boundaries including the horizontal direction and the vertical direction for a sequence constituted by a CG, it is possible to set to be limited to a partition type including a right angle, and since it is possible to set to relax the limitation of the partition type for a sequence including a natural image, the encoding efficiency can be maximized.

In a case where the method for selecting the boundary width candidates is set in units of pictures, the decoding unit 201 similarly decodes pps_div_enabled_flag, pps_div_multi_flag, and pps_div_multi_mode with the picture parameter set or the picture header.

By using pps_div_multi_mode, since the setting of the multiple line segment partitioning mode according to the image characteristics can be changed in units of pictures, an effect of maximizing the encoding efficiency can be expected.

For example, the setting can be made so as to limit a picture constituted by a CG to a partition type constituted by a right angle, and the setting can be made so as to relax the limitation of the partition type for a picture constituted by a natural image. Therefore, the encoding efficiency can be maximized.

In a case where the method for selecting the boundary width candidates is set in units of slices, the decoding unit 201 similarly decodes sh_div_enabled_flag, sh_div_multi_flag, and sh_div_multi_mode in the slice header.

By using sh_div_multi_mode, since the setting of the multiple line segment partitioning mode according to the image characteristics can be changed in units of slices, an effect of maximizing the encoding efficiency can be expected.

For example, the setting can be made so as to limit a slice region including a partial image constituted by a CG to a partition type including a right angle, and the setting can be made so as to relax the limitation of the partition type for a slice region including a natural image, so that the encoding efficiency can be maximized.

An increase in the code amount can be suppressed by performing setting only in an upper layer, and adaptive control can be performed by performing setting also in a lower layer and prioritizing the setting in the lower layer.

Alternatively, in a case where the multiple line segment partitioning mode is set in advance, decoding itself of the multiple line segment partitioning mode can be omitted.

Note that, in the above example, the method for setting the multiple line segment partitioning mode in units of sequences, pictures, or slices has been described. However, the multiple line segment partitioning mode may be directly set in units of blocks described later without setting these.

In this case, the degree of freedom in setting the multiple line segment partitioning mode is reduced, but it is possible to avoid an increase in the header information described above.

Figure 19:
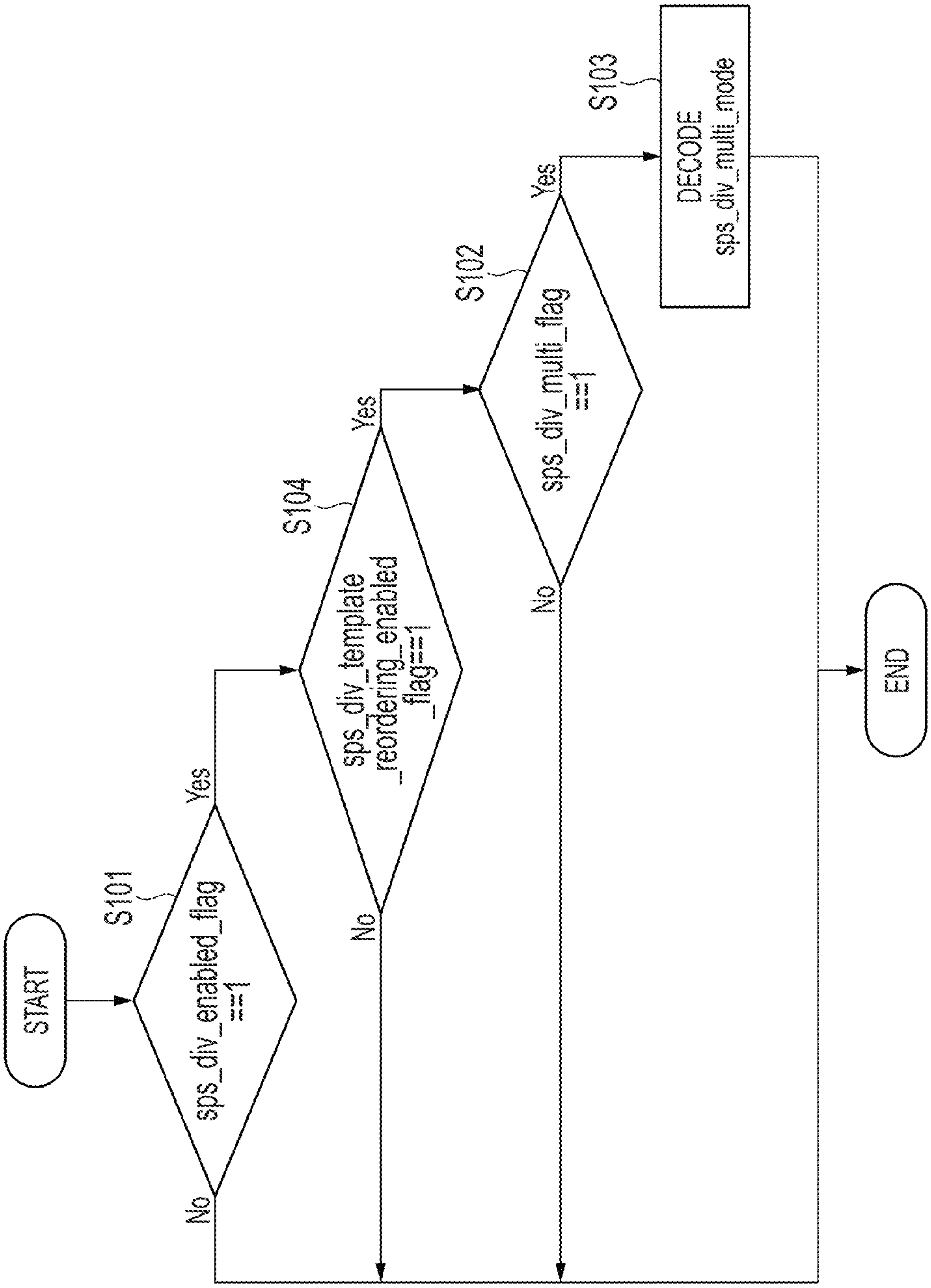
FIG. 19 is a flowchart illustrating a modified example of the operation of setting a method for selecting the multiple line segment partitioning mode in units of sequences.

With reference to FIG. 19, a modified example of the operation of setting the method for selecting the multiple line segment partitioning mode in units of sequences will be described.

As illustrated in FIG. 19, a difference between FIG. 19 and FIG. 10 is that step S104 is included.

In step 104, the decoding unit 201 determines whether a technology related to partitioning mode sorting associated with a decoded value of cu_div_idx (control information) for specifying a partitioning mode based on template matching to be described later (hereinafter, partitioning mode index sorting based on template) is valid in the sequence parameter set according to whether sps_div_template_reordering_enabled_flag (control information) controlled in units of sequences is 1.

Here, in a case where sps_div_template_reordering_enabled_flag is 1, it indicates that the partitioning mode index sorting based on the template is enabled, and in a case where sps_div_template_reordering_enabled_flag is 0, it indicates that the partitioning mode index sorting based on the template is disabled.

Note that a value of sps_div_template_reordering_enabled_flag is decoded by the decoding unit 201 before step S104 or is estimated without being decoded.

In a case where sps_div_template_reordering_enabled_flag is not decoded, the decoding unit 201 estimates a value of sps_div_template_reordering_enabled_flag to be 0.

In a case where sps_div_template_reordering_enabled_flag is 1 (Yes), the decoding unit 201 proceeds to step S102. In a case where sps_div_template_reordering_enabled_flag is 0 (No), this process ends.

Although details will be described later, the partitioning mode index sorting based on the template has an effect of shortening the code length of the partitioning mode index. Therefore, by determining that the multiple line segment partitioning mode is valid only in a case where the partitioning mode index sorting based on the template is valid, the code amount of cu_div_idx for specifying the type of the multiple line segment partitioning mode or the type of the partitioning mode including the multiple line segment partitioning mode in units of target blocks can be reduced, and as a result, improvement in encoding performance can be expected.

An example of an operation of setting the method for selecting the multiple line segment partitioning mode in units of blocks will be described with reference to FIG. 11.

Figure 11:
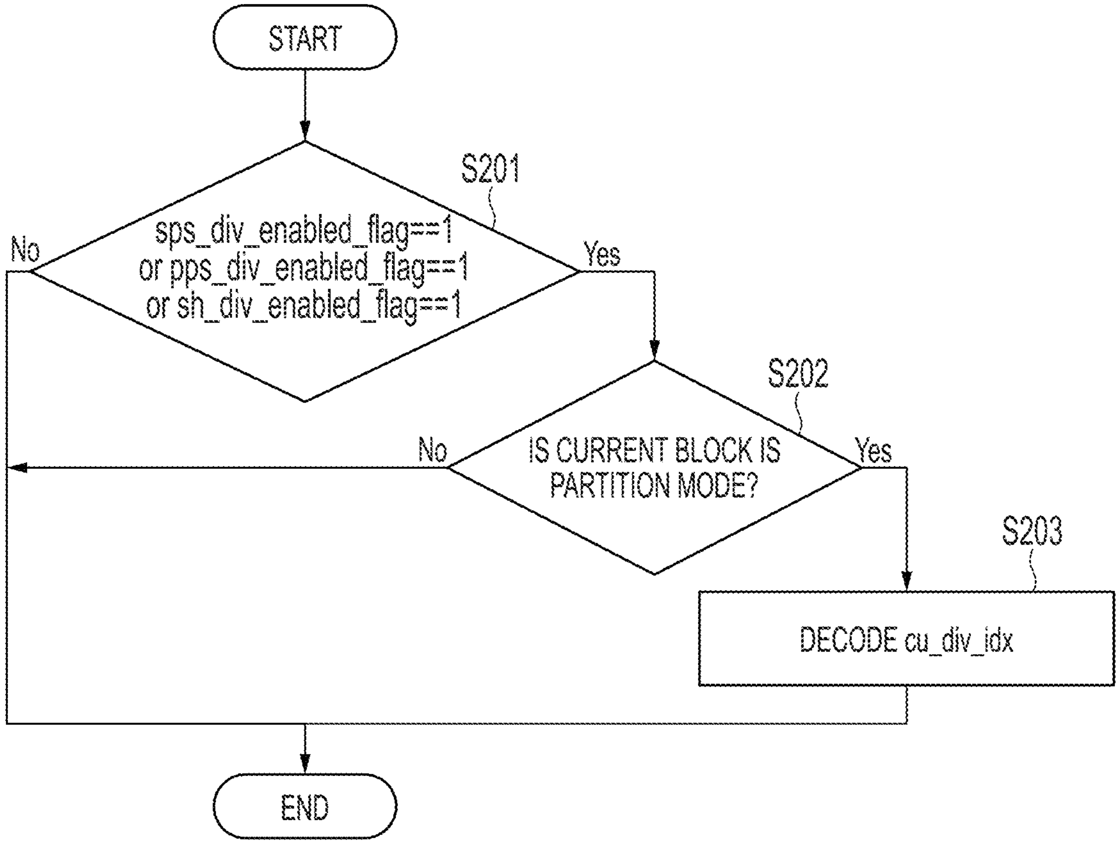
FIG. 11 is a flowchart illustrating an example of an operation of setting a selection method of the multiple line segment partitioning mode in units of blocks.

As illustrated in FIG. 11, in step S201, the decoding unit 201 determines whether any of sps_div_enabled_flag, pps_div_enabled_flag, and sh_div_enabled_flag is 1.

In a case where any of them is not 1, the present operation ends, and in a case where any of them is 1, the present operation proceeds to step S202.

In step S202, the decoding unit 201 determines whether the decoding target block is in the partitioning mode.

In the case of Yes, the present operation proceeds to Step S203, and in the case of No, the present operation ends.

In step S203, the decoding unit 201 decodes cu_div_idx, which is a control signal indicating the partitioning mode.

cu_div_idx is decoded so as to specify one of the candidates of the multiple line segment partitioning mode selected by div_multi_mode of the lowest layer applied to the decoding target block.

The decoding unit 201 decodes the above-described cu_div_idx and specifies the multiple line segment partitioning mode according to the decoded value.

Figure 18:
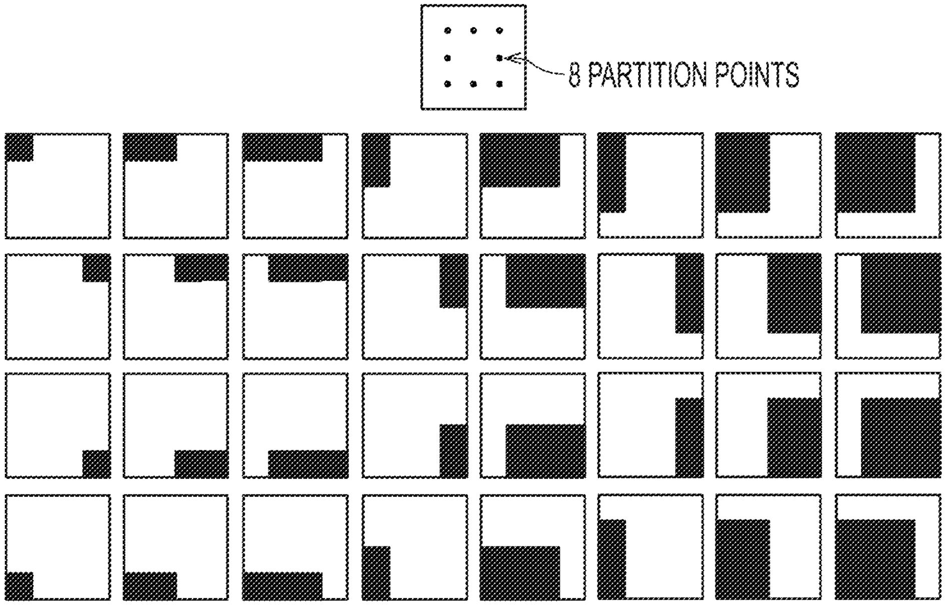
FIG. 18 is a diagram illustrating an example of association among cu_div_idx, divDirectionIdx, and divLocationIdx.

For example, the decoded values of 32 patterns of cu_div_idx as illustrated in FIG. 18 associated with 32 patterns of partitioning mode candidates of the multiple line segment partitioning mode illustrated in FIG. 5 are prepared.

Each decoded value of cu_div_idx corresponds to divDirectionIdx which is an internal parameter indicating partition directions (whether there is a partition boundary (region divided by partition line) in the upper left, the upper right, the lower right, or the lower left) of four patterns for specifying the pattern of the multiple line segment partitioning mode illustrated in FIG. 5 and divLocationIdx which is an internal parameter for determining partition points of eight patterns.

In a case where this multiple line segment partitioning mode is additionally applied to the geometric partitioning mode of Non Patent Literature 1, cu_div_idx can be added to a table associated with decoded values of 64 patterns of merge_gpm_partition_idx that specifies the geometric partitioning mode.

merge_gpm_partition_idx is associated with angleIdx representing angles of 20 patterns and distanceIdx representing distances of 4 patterns for representing 64 patterns of partition lines of the geometric partitioning mode.

In a case where the multiple line segment partitioning mode is additionally applied to the geometric partitioning mode, if divDirectionIdx and divLocationIdx are configured as new values of angleIdx and distanceIdx as internal parameters, the decoding unit 201 can specify the pattern of the multiple line segment partitioning mode in addition to the geometric partitioning mode by decoding merge_gpm_partition_idx.

An example of an operation of setting a method for selecting a partitioning mode including the multiple line segment partitioning mode in units of blocks will be described with reference to FIG. 20.

Figure 20:
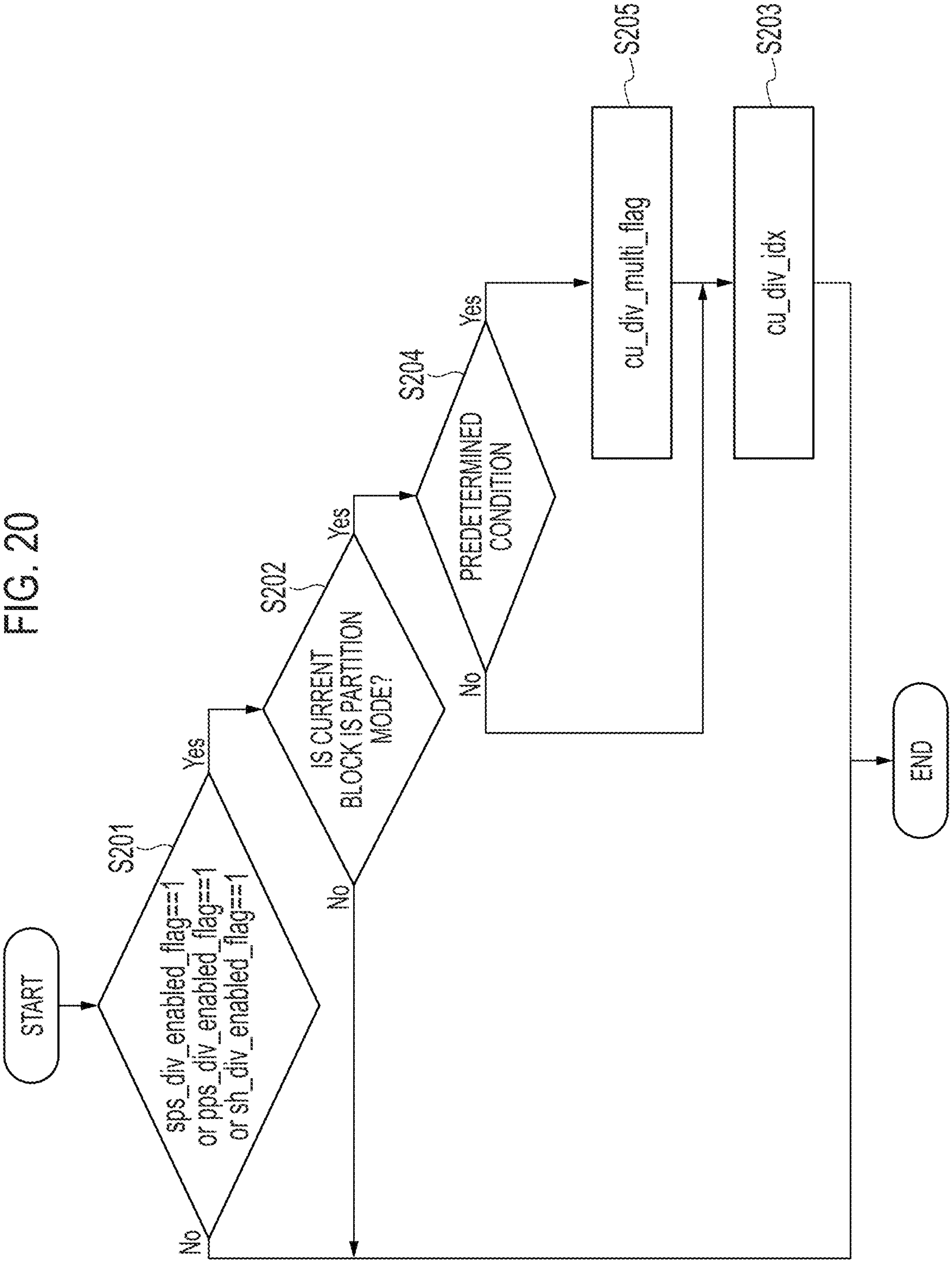
FIG. 20 is a flowchart illustrating a modified example of the operation of setting a method for selecting a partitioning mode including the multiple line segment partitioning mode in units of blocks.

As illustrated in FIG. 20, a difference between FIG. 20 and FIG. 11 is that step S204 and step S205 are included.

In step 104, the decoding unit 201 determines whether a predetermined condition is satisfied. In a case where it is determined that the predetermined condition is satisfied, the decoding unit 201 proceeds to step S205, and in a case where it is determined that the predetermined condition is not satisfied, the decoding unit proceeds to step S203.

Here, the predetermined condition may include a condition that the block size of the target block is equal to or smaller (or less) than a predetermined block size. The predetermined block size may be specified by the number of pixels to the power of 2, such as 8×8 pixels, 16×16 pixels, 32×32 pixels, 64×64 pixels, or 128×128 pixels.

In the multiple line segment partitioning mode, since the target block is divided by a plurality of line segments, it is difficult for a large-size block to align a partition boundary by the plurality of line segments with a block boundary in the block.

On the other hand, in the small-size block, since the partition boundary by the plurality of line segments is easily aligned with the block boundary in the block, the multiple line segment partitioning mode can be made valid only for the small-size block by setting the threshold of the block size so as to limit the large-size block as described above, and as a result, the encoding performance can be improved.

As a modified example, not the threshold determination based on the block size of the target block but the threshold determination based on the short side of the target block may be used.

Specifically, the predetermined condition in step S204 may include a condition that the short side of the target block is equal to or smaller (or less) than a predetermined pixel. The predetermined pixel may be specified by the number of pixels to the power of 2, such as 8 pixels, 16 pixels, 32 pixels, 64 pixels, or 128×128 pixels.

As a result, an effect similar to the threshold determination based on the block size of the target block described above can be obtained.

Conversely, this predetermined condition may include a condition that the block size of the target block is equal to or more (or larger) than a predetermined block size. The predetermined block size may be specified by the number of pixels to the power of 2, such as 4×4 pixels, 8×8 pixels, 16×16 pixels, or 32×32 pixels.

In the multiple line segment partitioning mode, since the target block is divided by the plurality of line segments, as described above, in the small-size block, the partition boundary by the plurality of line segments is easily aligned with the block boundary in the block. However, in the extremely small block size, the distance between the plurality of line segments or between the plurality of line segments and the target block boundary is shortened, and thus, a difference from the conventional partitioning mode in which the target block is divided by one line segment or the conventional coding block division hardly occurs.

Therefore, for an extremely small block size, as described above, the multiple line segment partitioning mode for a target block having an extremely small size can be invalidated by the threshold determination based on the block size. Therefore, the code amount of control information necessary for specifying the multiple line segment partitioning mode is reduced, and as a result, the encoding performance is improved.

As a modified example, not the threshold determination based on the block size of the target block but the threshold determination based on the long side of the target block may be used. Specifically, the predetermined condition in step S204 may include a condition that the long side of the target block is equal to or more (or larger) than a predetermined pixel. The predetermined pixel may be specified by the number of pixels to the power of 2, such as 4 pixels, 8 pixels, 16 pixels, or 32 pixels.

As a result, an effect similar to the threshold determination based on the block size of the target block described above can be obtained.

The decoding unit 201 determines whether a technology related to partitioning mode sorting associated with a decoded value of cu_div_idx (control information) for specifying a partitioning mode based on template matching to be described later (hereinafter, partitioning mode index sorting based on template) is valid in the sequence parameter set according to whether sps_div_template_reordering_enabled_flag (control information) controlled in units of sequences is 1.

In a case where sps_div_template_reordering_enabled_flag is 1, it indicates that the partitioning mode index sorting based on the template is enabled, and in a case where sps_div_template_reordering_enabled_flag is 0, it indicates that the partitioning mode index sorting based on the template is disabled.

In a case where sps_div_template_reordering_enabled_flag is 1 (Yes), the decoding unit 201 proceeds to step S102.

On the other hand, in a case where sps_div_template_reordering_enabled_flag is 0 (No), the decoding unit 201 ends this process.

Although details will be described later, the partitioning mode index sorting based on the template has an effect of shortening the code length of the partitioning mode index. Therefore, by determining that the multiple line segment partitioning mode is valid only in a case where the partitioning mode index sorting based on the template is valid, the code amount of cu_div_idx (control information) for specifying the type of the multiple line segment partitioning mode or the type of the partitioning mode including the multiple line segment partitioning mode in units of decoding target blocks can be reduced, and as a result, improvement in encoding performance can be expected.

(Method for Deriving Motion Information for Multiple Line Segment Partitioning Mode)

Hereinafter, a method for deriving motion information for the multiple line segment partitioning mode will be described.

As the motion information for the small region A or the small region B divided in the multiple line segment partitioning mode, the same method for deriving the motion information as that in the geometric partitioning mode disclosed in Non Patent Literature 1 may be applied.

Specifically, the motion compensation unit 208 creates, for the small region A and the small region B, a motion information candidate list (merge candidate list) including motion information of neighboring blocks of the decoding target block, and derives motion information from the merge candidate list by using control information (merge index) for identifying motion information in the merge candidate list transmitted from the image encoding device.

In a case where both the small region A and the small region B are inter predictions, the decoding unit 201 decodes merge indexes indicating different motion information candidates so that different motion information is derived for each region.

Figure 17:
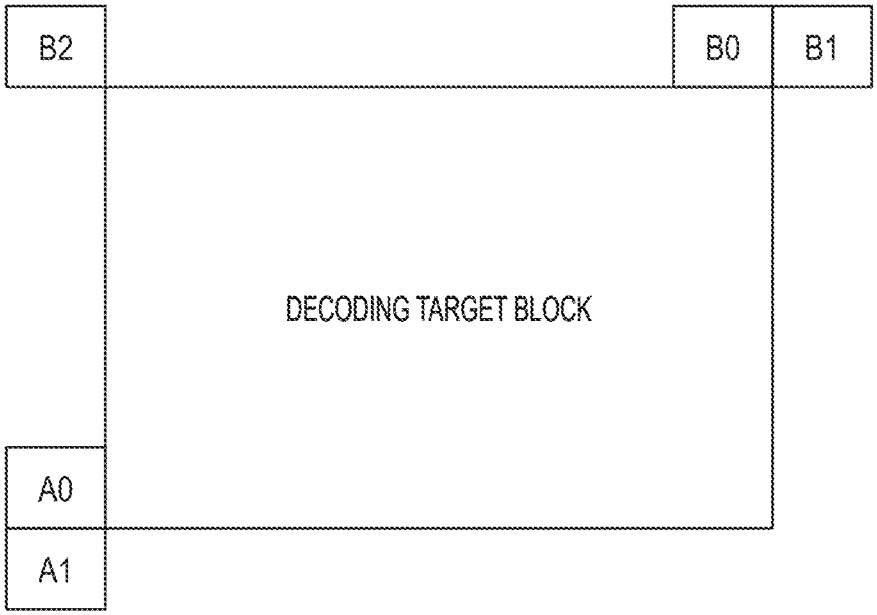
FIG. 17 is a diagram illustrating an example of a method for deriving an intra prediction mode based on an adjacent reference block with respect to normal intra prediction according to Non Patent Literature 1 and Non Patent Literature 2, and a method for deriving an intra prediction mode based on an adjacent reference block with respect to a geometric partitioning mode according to the present embodiment to which such a derivation method is applied.

Non Patent Literature 1 discloses a technique called spatial merging as a method for deriving and registering motion information candidates in a motion information candidate list. Specifically, the motion information at positions A0, A1, B0, B1, and B2 adjacent to the decoding target block illustrated in FIG. 17 is registered in the motion information candidate list as a candidate (spatial merging candidate) of the motion information of the decoding target block.

The motion compensation unit 208 may limit the spatial merging candidates that can be registered in the motion information candidate list according to the multiple line segment partitioning mode. Specifically, the registration may be limited to only the spatial merging adjacent to each small region divided according to the multiple line segment partitioning mode.

In a case where none of the spatial merging candidates is adjacent to each small region, the registerable spatial merging candidates may be limited to only the nearest spatial merging candidate, or may be limited to only N (N is a natural number, and N<M) spatial merging candidates located at proximity positions with respect to all M (M is a natural number, and five cases are exemplified above) spatial merging candidates.

In addition, in a case where the small region divided by the multiple line segment partitioning mode is located at the lower right end of the decoding target block and the distance from all the spatial merging candidates is long, all the candidates may be included in the registration target for this small region.

Note that, in FIG. 17, a total of five cases of one upper left end, two right ends, and two lower left ends of the decoding target block are illustrated as spatial merging candidates, but the present technology can also be applied to a case of handling a new spatial merging candidate position with respect to Non Patent Literature 1, such as between B2 and B0 or between B2 and A0.

(Method for Deriving Intra Prediction Mode for Multiple Line Segment Partitioning Mode)

Hereinafter, a method for deriving the intra prediction mode for the multiple line segment partitioning mode will be described.

The synthesis unit 205 may apply a parallel angular prediction mode to each partition line for the intra prediction mode for the small region A or the small region B divided in the multiple line segment partitioning mode.

Alternatively, the synthesis unit 205 may apply a vertical angular prediction mode to each partition line for the intra prediction mode for the small region A or the small region B divided in the multiple line segment partitioning mode.

Figure 12:
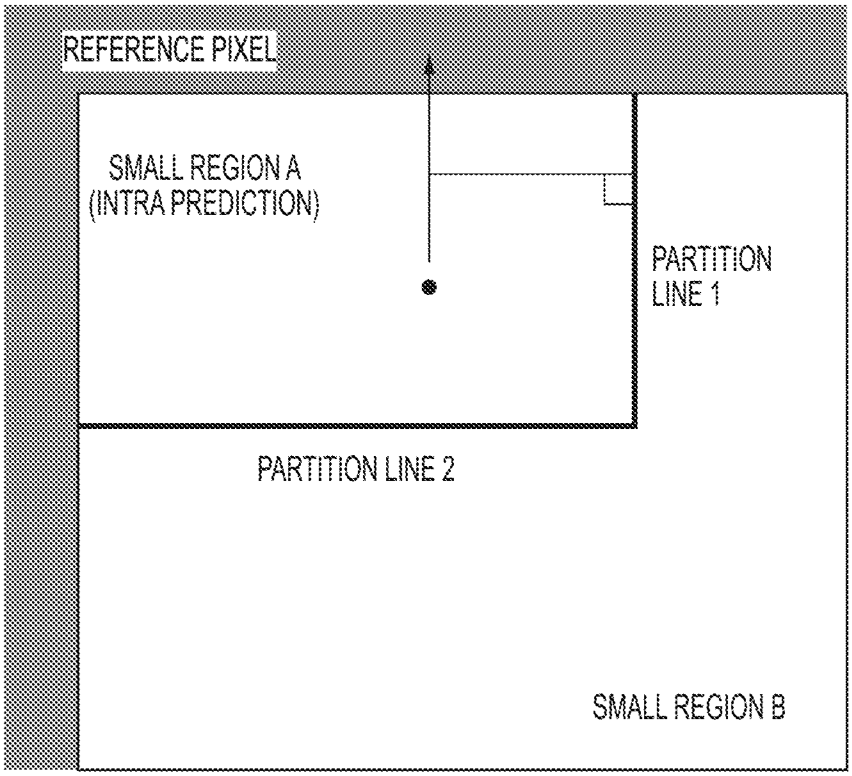
FIG. 12 is a diagram illustrating an example of a case where a parallel angular prediction mode is applied to the partition line 1.

FIG. 12 illustrates an example of a case where the parallel angular prediction mode is applied to the partition line 1.

Alternatively, the synthesis unit 205 may derive the intra prediction mode for the small region A or the small region B divided in the multiple line segment partitioning mode using the derivation technology based on the analysis of the adjacent pixels disclosed in Non Patent Literature 2.

Three types of derivation techniques will be described below.

[Intra Prediction Mode Derivation Method 1 Based on Adjacent Reference Pixel]

Hereinafter, a method of deriving an intra prediction mode based on an adjacent reference pixel with respect to normal intra prediction according to Non Patent Literature 2, and a method 1 of deriving an intra prediction mode based on an adjacent reference pixel with respect to a geometric partitioning mode according to the present embodiment to which the derivation method is applied with reference to FIGS. 13 to 15C.

Figure 13:
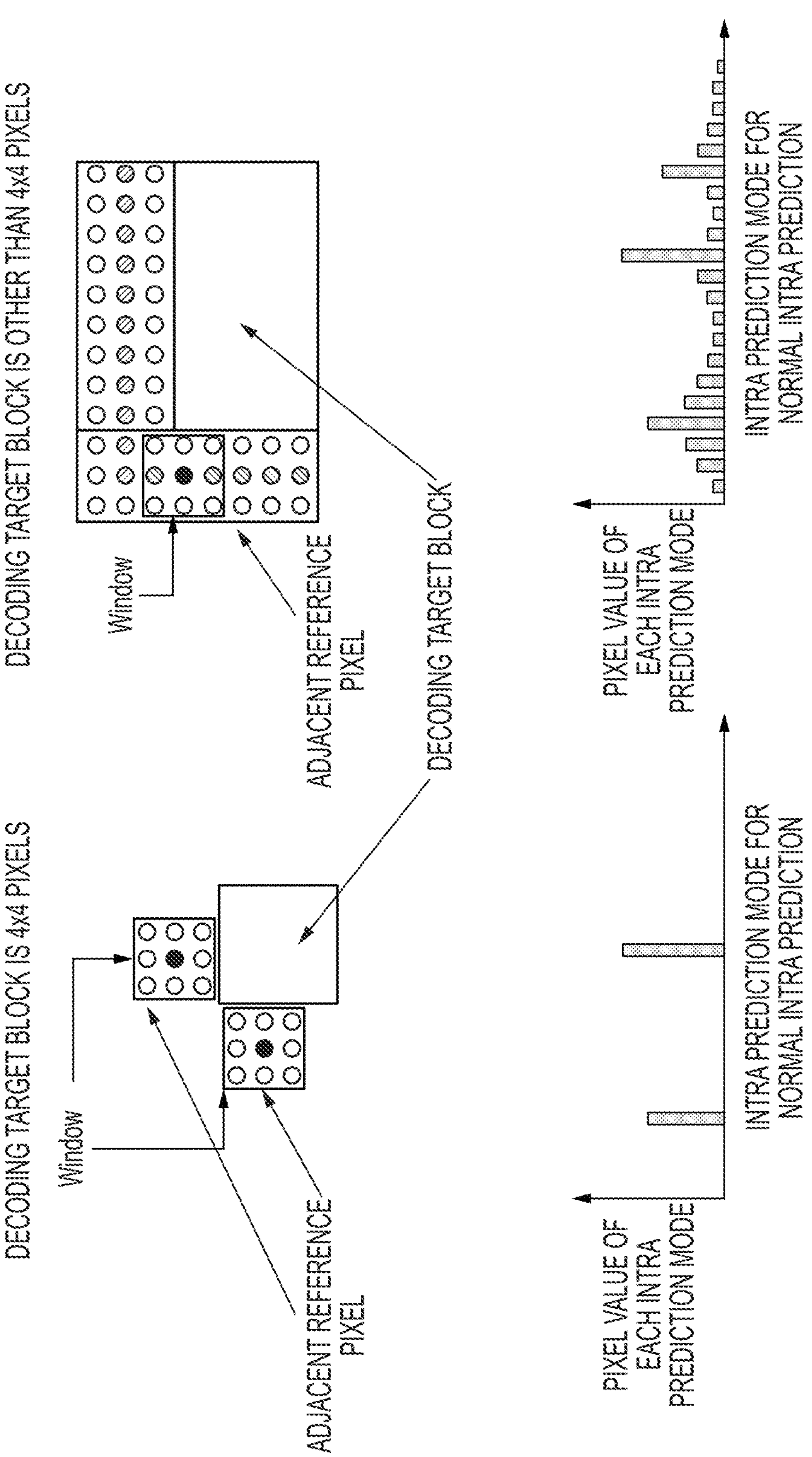
FIG. 13 is a diagram for explaining an intra prediction mode derivation method according to the present embodiment.

FIG. 13 is a diagram illustrating an example of a method for deriving an intra prediction mode based on an adjacent reference pixel with respect to normal intra prediction according to Non Patent Literature 2, and a method 1 of deriving an intra prediction mode based on an adjacent reference pixel with respect to a geometric partitioning mode according to the present embodiment to which such a derivation method is applied. Hereinafter, these derivation methods are collectively referred to as "DIMD (Decoder-side Intra Mode Derivation)".

In Non Patent Literature 2, in the DIMD, as illustrated in FIG. 13, horizontal and vertical Sobel filters of a window size of 3×3 pixels are applied to the adjacent reference pixels adjacent to the decoding target block, and a histogram of pixel values for all Angular prediction modes for the normal intra prediction is calculated. Here, a detailed description of the method for calculating the angle and the pixel value of the adjacent reference pixel to be associated with each Angular prediction mode by applying the Sobel filters will be omitted because the same configuration as that of Non Patent Literature 2 can be adopted in the present embodiment.

In Non Patent Literature 2, the adjacent reference pixel region used for calculation of the histogram is controlled as illustrated in FIG. 13 according to a block size of the decoding target block. Specifically, in the 4×4 pixel block, the histogram is calculated by using only the upper and left 3×3 pixel areas of the uppermost and leftmost pixels of the decoding target block.

In Non Patent Literature 2, intra prediction pixels are generated using the intra prediction mode and the planar mode that are the highest and second highest pixel values in the calculated histogram, and further, the generated intra prediction pixels are weighted and averaged using a predetermined weight value to generate a final intra prediction pixel.

In the present embodiment, the synthesis unit 205 may apply the DIMD disclosed in Non Patent Literature 2 described above only to the derivation of the intra prediction mode of the multiple line segment partitioning mode. That is, the process of synthesizing/generating the intra prediction pixel using the plurality of derived intra prediction modes is not performed.

As a result, intra prediction pixels can be generated in one intra prediction mode in the intra prediction area (in the case of the Intra/Intra-multiple line segment partitioning mode, two intra prediction areas) of the multiple line segment partitioning mode. This makes it possible to apply intra prediction reflecting a texture such as an edge suitable for the partitioned shape of the multiple line segment partitioning mode by analyzing the histogram of the adjacent reference pixel of the decoding target block while avoiding an increase in circuit scale necessary for generating the intra prediction pixel of the multiple line segment partitioning mode in the hardware-implemented image decoding device. Therefore, intra prediction performance is improved, as a result of which improvement in encoding performance can be expected.

Note that, in the present embodiment, similarly to Non Patent Literature 2, the decoding unit 201 may be configured to determine whether to derive the intra prediction mode by decoding or estimating a flag for determining whether the DIMD is applicable.

Furthermore, the synthesis unit 205 according to the present embodiment may be configured to register the intra prediction mode derived by the DIMD in a case where the same intra prediction mode has not been already included in the intra prediction mode candidate list for the multiple line segment partitioning mode, and not to register the intra prediction mode derived by the DIMD in a case where the same intra prediction mode has been already included in the intra prediction mode candidate list for the multiple line segment partitioning mode.

According to such a configuration, the same intra prediction mode can be prevented from being redundantly registered in the intra prediction mode candidate list.

Here, when a new intra prediction mode is registered in the intra prediction mode candidate list, consistency with the existing intra prediction mode is compared, and if both match, the process of pruning is hereinafter referred to as "intra prediction mode candidate pruning processing".

Furthermore, the synthesis unit 205 according to the present embodiment may limit the number of intra prediction modes to be registered in the intra prediction mode candidate list to one among the intra prediction modes derived by the DIMD. In this case, the synthesis unit 205 derives the Angular prediction mode that is the highest pixel value (luminance value) from the histogram.

In the intra prediction mode candidate pruning processing described above, in a case where the Angular prediction mode (hereinafter, 1st Angular prediction mode) that is the highest pixel value (luminance value) is pruned, the 1st Angular prediction mode may be sequentially compared with the existing intra prediction modes from the higher histogram, and the intra prediction mode that do not match the existing intra prediction mode may be registered.

Alternatively, in a case where the 1st Angular prediction mode is pruned in the intra prediction mode candidate pruning processing described above, the intra prediction mode derivation processing by the DIMD may be ended.

As a modified example, the number of intra prediction modes to be registered in the intra prediction mode candidate list among the intra prediction modes derived by the DIMD may be limited to two. In such a case, the synthesis unit 205 derives the 1st Angular prediction mode and the 2nd Angular prediction mode that is a second highest pixel value (luminance value) from the histogram.

In a case where the 1st Angular prediction mode or the 2nd Angular prediction mode is pruned, similarly to the above case, the 1st or 2nd Angular prediction mode may be compared with the existing intra prediction modes from the next highest histogram, and the prediction mode that does not match the existing intra prediction mode may be registered, or the intra prediction mode deriving processing the by DIMD may be ended as it is.

Furthermore, the synthesis unit 205 according to the present embodiment may limit the adjacent reference pixels to be used in the above-described DIMD histogram calculation to a predetermined region on the basis of the partitioned shape (that is, the angle of the multiple line segment partitioning mode partition line) in the multiple line segment partitioning mode.

FIG. 14 is a diagram illustrating a table for limiting an area of a template (adjacent reference pixel) to be referred to on the basis of a partition line of a multiple line segment partitioning mode in a technology called template matching for the multiple line segment partitioning mode disclosed in Non Patent Literature 2.

Specifically, A and L illustrated in FIG. 14 indicate an upper portion and a left portion of the decoding target block, respectively.

In the present embodiment, by applying the table of (limited) adjacent reference pixels defined based on the partition line of the multiple line segment partitioning mode disclosed in Non Patent Literature 2 to the calculation of the DIMD histogram, Angular prediction can be derived using adjacent reference pixels existing only in the direction of the partition line of the multiple line segment partitioning mode while avoiding using all the adjacent reference pixels adjacent to the decoding target block for the calculation in the calculation of the DIMD histogram, so that the processing load of deriving the intra prediction mode by the DIMD for the inter prediction of the multiple line segment partitioning mode can be reduced.

Alternatively, instead of the adjacent reference pixel table in FIG. 14 described above, as illustrated in FIGS. 15A, 15B and 15C, the synthesis unit 205 may derive the intra prediction mode according to the DIMD using only the reference pixel region facing across the block boundary on the left or upper side of the decoding target block with respect to the small region A or the small region B divided in the multiple line segment partitioning mode.

Figure 15A:
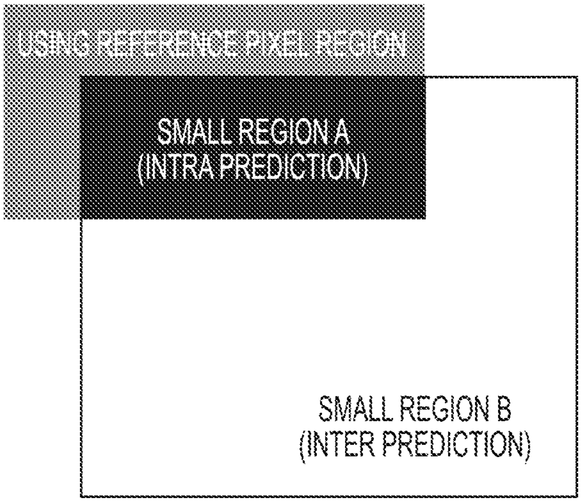
FIGS. 15A, 15B and 15C are diagrams for explaining the intra prediction mode derivation method according to the present embodiment.
Figure 15B:
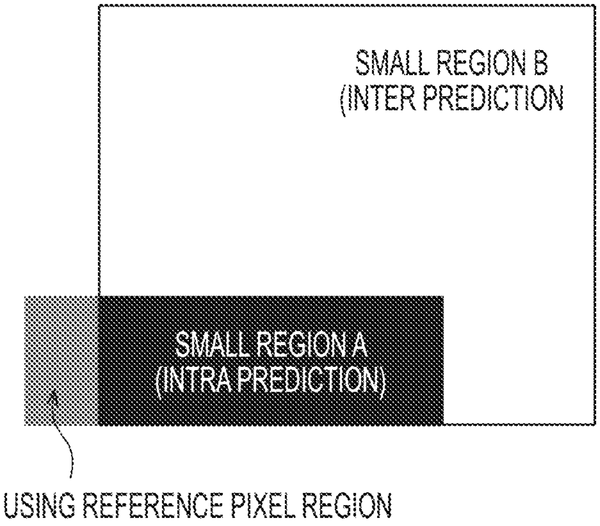
Figure 15C:
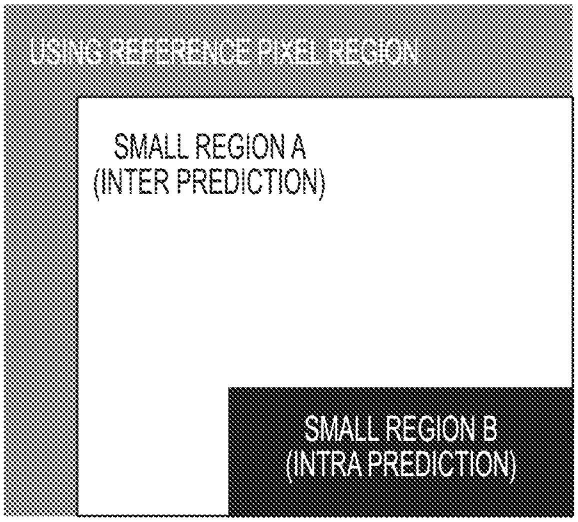

Furthermore, in the multiple line segment partitioning mode, as illustrated in the example of FIG. 15C, in a case where there is no reference pixel region facing across the left or upper block boundary of the decoding target block with respect to the small region A or the small region B, the synthesis unit 205 may derive the intra prediction mode according to the DIMD using all the reference pixels as illustrated in FIG. 15C.

[Intra Prediction Mode Derivation Method 2 Based on Adjacent Reference Pixel]

Hereinafter, a method for deriving an intra prediction mode based on an adjacent reference pixel with respect to normal intra prediction according to Non Patent Literature 3, and a method 2 of deriving an intra prediction mode based on an adjacent reference pixel with respect to a geometric partitioning mode according to the present embodiment to which the derivation method is applied with reference to FIGS. 14 to 16.

Figure 16:
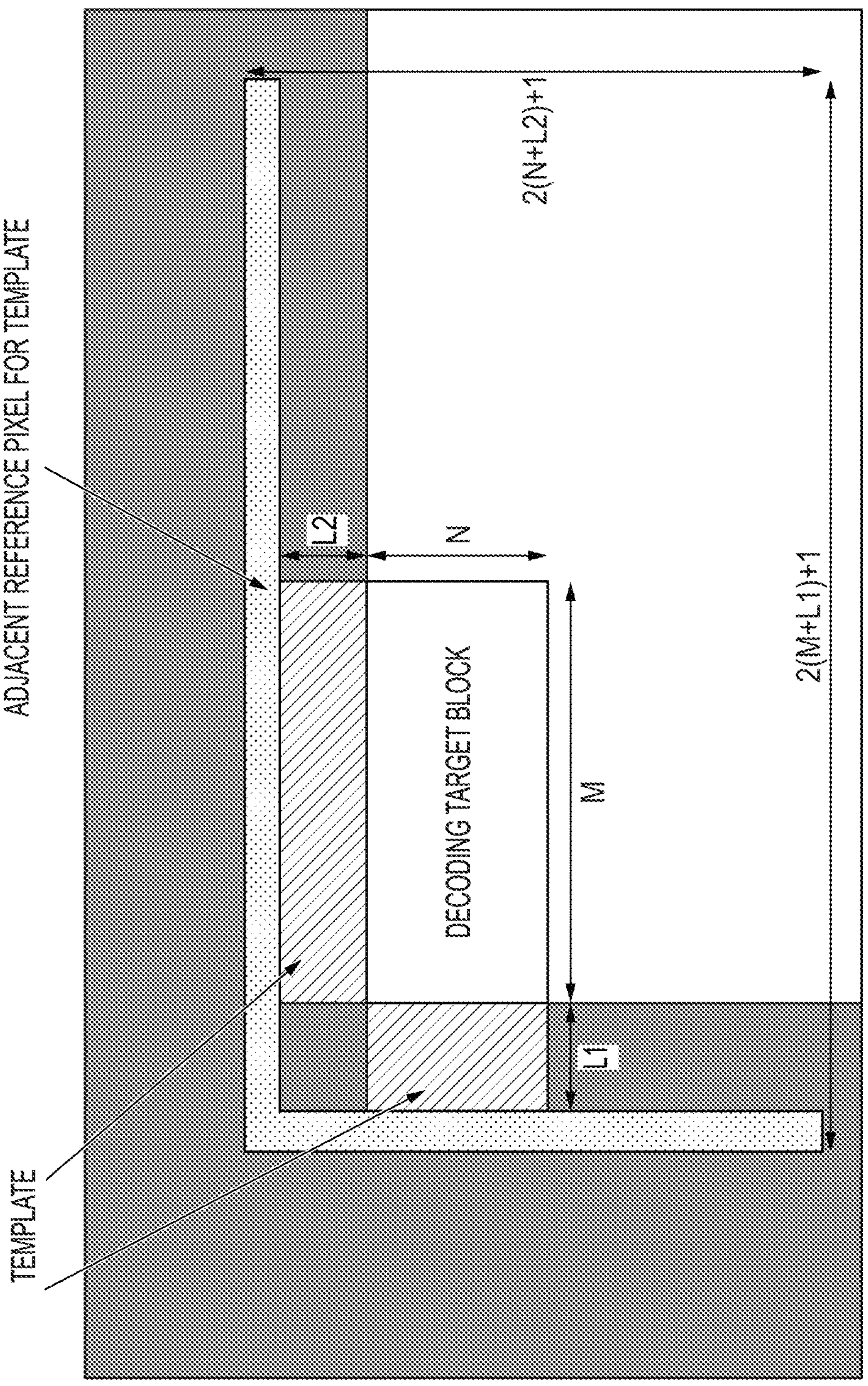
FIG. 16 is a diagram for explaining the intra prediction mode derivation method according to the present embodiment.

FIG. 16 is a diagram illustrating an example of a method for deriving an intra prediction mode based on an adjacent reference pixel with respect to normal intra prediction according to Non Patent Literature 3, and the method 2 of deriving an intra prediction mode based on an adjacent reference pixel with respect to a geometric partitioning mode according to the present embodiment to which such a derivation method is applied. Hereinafter, these derivation methods are collectively referred to as “Template-based Intra Mode Derivation (TIMD)”.

In Non Patent Literature 3, in the TIMD, as illustrated in FIG. 16, a sum of absolute transformed difference (SATD) of adjacent reference pixels (hereinafter, a template) of a predetermined line adjacent to the decoding target block, adjacent reference pixels for the template and intra prediction pixel for the template (hereinafter, intra prediction pixels for the template) generated using a predetermined intra prediction mode is calculated, and an intra prediction mode in which the SATD is minimum and the next highest among the predetermined intra prediction modes is derived as the intra prediction mode of the TIMD to generate an intra prediction pixel.

Here, the intra prediction mode used in the calculation of the SATD of the TIMD described above is the intra prediction mode included in the intra prediction mode candidate list for the normal intra prediction.

In the TIMD in Non Patent Literature 3, in a case where a vertical prediction mode, a horizontal prediction mode, and a DC prediction mode are not included in the intra prediction mode candidate list for the normal intra prediction, the SATD is calculated to derive the intra prediction mode in a state where those modes are included.

In the present embodiment, the synthesis unit 205 may derive the intra prediction mode by applying the TIMD disclosed in Non Patent Literature 3. That is, the synthesis unit 205 does not perform the intra prediction pixel synthesis/generation processing using the plurality of derived intra prediction modes.

According to the above configuration, intra prediction pixels can be generated in one intra prediction mode in the intra prediction area (in the case of the Intra/Intra-multiple line segment partitioning mode, two intra prediction areas) of the multiple line segment partitioning mode. This makes it possible to apply intra prediction reflecting a texture such as an edge suitable for the partitioned shape of the multiple line segment partitioning mode by analyzing the histogram of the adjacent reference pixel of the decoding target block while avoiding an increase in circuit scale necessary for generating the intra prediction pixel of the multiple line segment partitioning mode in the hardware-implemented image decoding device. Therefore, intra prediction performance is improved, as a result of which improvement in encoding performance can be expected.

Note that, in the present embodiment, similarly to Non Patent Literature 2, the decoding unit 201 may be configured to determine whether to derive the intra prediction mode by decoding or estimating a flag for determining whether the TIMD is applicable.

Furthermore, the synthesis unit 205 according to the present embodiment may be configured to register the intra prediction mode derived by the TIMD in a case where the same intra prediction mode has not been already included in the intra prediction mode candidate list for the multiple line segment partitioning mode, and not to register the intra prediction mode derived by the TIMD in a case where the same intra prediction mode has been already included in the intra prediction mode candidate list for the multiple line segment partitioning mode.

According to such a configuration, the same intra prediction mode can be prevented from being redundantly registered in the intra prediction mode candidate list.

Here, when a new intra prediction mode is registered in the intra prediction mode candidate list, consistency with the existing intra prediction modes is compared, and if both match, the process of pruning is hereinafter referred to as “intra prediction mode candidate pruning processing”.

Furthermore, the synthesis unit 205 according to the present embodiment may limit the number of intra prediction modes to be registered in the intra prediction mode candidate list to one among the intra prediction modes derived by the TIMD. In such a case, the synthesis unit 205 derives the intra prediction mode (Angular prediction) that is the minimum SATD cost from the calculation of the SATD.

However, in the present embodiment, in the calculation of the SATD in the TIMD processing, the DC prediction mode may be excluded from the calculation of the SATD, unlike Non Patent Literature 3.

This is because the DC prediction in which the intra prediction pixel is generated using all the adjacent reference pixels adjacent to the decoding target block cannot appropriately reflect the texture such as the edge according to the partitioned shape of the multiple line segment partitioning mode, and the intra prediction pixel may be generated. Therefore, with exclusion of the DC prediction from the calculation of the SAID in the TIMD processing, the DC prediction mode can be avoided from being derived in the TIMD.

Note that, in the intra prediction mode candidate pruning processing described above, in a case where the Angular prediction mode (hereinafter, the 1st Angular prediction mode), which is the minimum SATD cost, is pruned, the 1st Angular prediction mode may be sequentially compared with the existing intra prediction modes in ascending order of the SATD cost, and the prediction mode that do not match the existing intra prediction mode may be registered. Alternatively, in a case where the 1st Angular prediction mode is pruned, the process of deriving the intra prediction mode by the TIMD may be ended.

As a modified example, the number of intra prediction modes to be registered in the intra prediction mode candidate list among the intra prediction modes derived by the TIMD may be limited to two. In such a case, the synthesis unit 205 derives the 1st Angular prediction mode and the 2nd Angular prediction mode, which is the second minimum one of the minimum SATD cost, from the SATD cost.

Note that, in a case where the 1st Angular prediction mode or the 2nd Angular prediction mode is pruned, similarly to the above case, the 1st or 2nd Angular prediction mode may be compared with the existing intra prediction modes from the next lowest SATD cost, and the prediction mode which does not match the existing intra prediction mode may be registered, or the process of deriving the intra prediction mode by the TIMD may be ended as it is.

Furthermore, the synthesis unit 205 according to the present embodiment may limit the adjacent reference pixels to be used in the calculation of the above-described TIMD histogram to a predetermined region on the basis of the partitioned shape (that is, the angle of the multiple line segment partitioning mode partition line) in the multiple line segment partitioning mode.

In the present embodiment, by applying the table of adjacent reference pixel regions defined based on the partition line of the multiple line segment partitioning mode disclosed in Non Patent Literature 2 illustrated in FIG. 14 to the calculation of the SATD in the TIMD processing, Angular prediction can be derived using adjacent reference pixels existing only in the direction of the partition line of the multiple line segment partitioning mode while avoiding using all the adjacent reference pixels adjacent to the decoding target block for the calculation of the SATD in the TIMD processing, so that the processing load of deriving the intra prediction mode by the TIMD for the inter prediction of the multiple line segment partitioning mode can be reduced.

Furthermore, in a case where the same intra prediction mode as the intra prediction mode used for calculation of the SATD in the TIMD processing has already been registered in the intra prediction mode candidate list, the synthesis unit 205 according to the present embodiment may be configured not to perform the processing after the calculation of the SATD of the above intra prediction mode.

According to such a configuration, the same intra prediction mode can be avoided from being redundantly registered through the TIMD processing with respect to the intra prediction mode already registered in the intra prediction mode, thereby making it possible to reduce the load of the TIMD processing on the inter prediction of the multiple line segment partitioning mode.

Alternatively, instead of the adjacent reference pixel table illustrated in FIG. 14 described above, as illustrated in FIGS. 15A, 15B and 15C, the synthesis unit 205 may derive the intra prediction mode according to the TIMD using only the reference pixel region facing across the block boundary on the left or upper side of the decoding target block with respect to the small region A or the small region B divided in the multiple line segment partitioning mode.

Furthermore, in the multiple line segment partitioning mode, as illustrated in FIG. 15C, in a case where there is no reference pixel region facing across the left or upper block boundary of the decoding target block with respect to the small region A or the small region B, the synthesis unit 205 may derive the intra prediction mode according to the TIMD using all the reference pixels as illustrated in FIG. 15C.

[Intra Prediction Mode Derivation Method Based on Adjacent Reference Block]

Hereinafter, a description will be given of a method for deriving an intra prediction mode based on an adjacent reference block with respect to normal intra prediction according to Non Patent Literature 1 and Non Patent Literature 2, and a method for deriving an intra prediction mode based on an adjacent reference block with respect to a geometric partitioning mode according to the present embodiment to which such a derivation method is applied with reference to FIGS. 14 and 17.

FIG. 17 is a diagram illustrating an example of a method for deriving an intra prediction mode based on an adjacent reference block with respect to normal intra prediction according to Non Patent Literature 1 and Non Patent Literature 2, and a method for deriving an intra prediction mode based on an adjacent reference block with respect to a geometric partitioning mode according to the present embodiment to which such a derivation method is applied. Hereinafter, these derivation methods are collectively referred to as "Block-based Intra Mode Derivation (BIMD) ".

In Non Patent Literature 3, in the BIMD, as illustrated in FIG. 17, an intra prediction mode of an adjacent reference block at a predetermined position adjacent to a decoding target block is derived as an intra prediction mode of the BIMD to generate an intra prediction pixel. Note that, as the intra prediction mode of the adjacent reference block derived here, in a case where the adjacent reference block is an intra prediction block, the intra prediction mode included in the adjacent reference block is referred to as it is. However, in a case where the adjacent reference block is an inter prediction block or a block to which the multiple line segment partitioning mode is applied where an inter prediction block and an intra prediction are applied, an intra prediction mode stored in units of 4×4 sub-block pixels to be described later is referred to.

Here, in Non Patent Literature 1 and Non Patent Literature 2, the adjacent reference blocks referred to in the above-described BIMD are set to the left (A0), the lower left (A1), the upper (B0), the upper right (B1), and the upper left (B2) of the decoding target block as illustrated in FIG. 17.

In the present embodiment, the synthesis unit 205 may derive the intra prediction mode by applying the BIMD disclosed in Non Patent Literatures 1 and 2. That is, the synthesis unit 205 does not perform the intra prediction pixel synthesis/generation processing using the plurality of derived intra prediction modes.

According to such a configuration, the intra prediction mode can be selected from the intra prediction mode candidate list in which the intra prediction mode of the adjacent reference block of the decoding target block can be included with respect to the intra prediction area (in the case of Intra/Intra-multiple line segment partitioning mode, two intra prediction areas) of the multiple line segment partitioning mode to generate the intra prediction pixel. Therefore, the intra prediction reflecting the texture such as the edge suitable for the partitioned shape of the multiple line segment partitioning mode can be applied, and the intra prediction performance is improved, as a result of which the improvement of the encoding performance can be expected.

Furthermore, the synthesis unit 205 according to the present embodiment may be configured to register the intra prediction mode derived by the BIMD in a case where the same intra prediction mode has not been already included in the intra prediction mode candidate list for the multiple line segment partitioning mode, and not to register the intra prediction mode derived by the BIMD in a case where the same intra prediction mode has been already included in the intra prediction mode candidate list for the multiple line segment partitioning mode.

According to such a configuration, the same intra prediction mode can be prevented from being redundantly registered in the intra prediction mode candidate list.

Here, when a new intra prediction mode is registered in the intra prediction mode candidate list, consistency with the existing intra prediction mode is compared, and the pruning process in the case where both match is hereinafter referred to as "intra prediction mode candidate pruning processing".

Furthermore, unlike Non Patent Literature 1 and Non Patent Literature 2, the synthesis unit 205 according to the present embodiment may be configured not to register a DC prediction mode in the intra prediction mode candidate list in a case where the intra prediction mode derived by the BIMD is the DC prediction mode.

This is because the DC prediction in which the intra prediction pixel is generated using all the adjacent reference pixels adjacent to the decoding target block cannot appropriately reflect the texture such as the edge according to the partitioned shape of the multiple line segment partitioning mode, and the intra prediction pixel may be generated. Therefore, the DC prediction is excluded from the intra prediction mode of the BIMD, and the DC prediction mode can be avoided from being used to generate the intra prediction pixel.

Furthermore, the synthesis unit 205 according to the present embodiment may configure the order of up to five adjacent reference blocks illustrated in FIG. 17 to be referred to in deriving the intra prediction mode by the BIMD, similarly to Non Patent Literature 1 and Non Patent Literature 2. Note that, since the order of reference is disclosed in Non Patent Literature 1 and Non Patent Literature 2, a detailed description thereof is omitted in the present embodiment.

As a modified example, in the present embodiment, by applying the table of the adjacent reference pixel regions defined (limited) based on the partition line of the multiple line segment partitioning mode disclosed in Non Patent Literature 2 illustrated in FIG. 14 to the reference to the adjacent reference block of the BIMD, the intra prediction mode can be derived by referring only to the intra prediction mode (Angular prediction) of the adjacent reference block existing only in the direction of the partition line of the multiple line segment partitioning mode while avoiding referring to the intra prediction modes of all the adjacent reference blocks adjacent to the decoding target block in the derivation of the intra prediction mode of the BIMD, so that the load of the derivation processing of the intra prediction mode by the BIMD for the inter prediction of the multiple line segment partitioning mode can be reduced.

[Intra Prediction Mode Derivation Method Using Control Information]

For the types of the different intra prediction modes described above, the synthesis unit 205 may uniquely apply the intra prediction mode described above, or may select the intra prediction mode to be actually applied from a plurality of different intra prediction mode candidates included in the intra prediction mode candidate list according to the control information.

A configuration example of a plurality of different intra prediction modes included in the intra prediction mode candidate list will be described below. Here, an angular prediction mode (Parallel) parallel to a partition line and an angular prediction mode (Perpendicular) perpendicular to the partition line are described.

Configuration Example 1. DIMD⇒Parallel (or Perpendicular)

Configuration Example 2. TIMD⇒Parallel (or Perpendicular)

Configuration Example 3. BIMD⇒Parallel (or Perpendicular)

Configuration Example 4. DIMD⇒TIMD⇒Parallel (or Perpendicular)

Configuration Example 5. DIMD⇒BIMD⇒Parallel (or Perpendicular)

Configuration Example 6. TIMD⇒BIMD⇒Parallel (or Perpendicular)

Configuration Example 7. DIMD⇒TIMD⇒BIMD⇒Parallel (or Perpendicular)

First, configuration examples 1 to 3 are methods in which Parallel (or Perpendicular) is combined with DIMD, TIMD, and BIMD.

The intra prediction mode derived by Parallel (or Perpendicular) can more easily and directly derive an intra prediction mode reflecting a texture such as an edge based on a partition line than the intra prediction mode derived by DIMD, TIMD, and BIMD, but since it is less likely to derive a prediction mode with higher accuracy than DIMD, TIMD, and BIMD based on analysis of adjacent reference pixels, the intra prediction mode is arranged in the list after these intra prediction mode candidates.

Next, the configuration examples 4 and 5 are configuration examples in which the DIMD is arranged before the TIMD or the BIMD.

The reason for placing the DIMD before the TIMD is that the derivation processing of the intra prediction mode by the DIMD is lighter than the derivation of the intra prediction mode by the TIMD in which relatively heavy calculation processing such as calculation of the SATD is included.

On the other hand, the reason why the DIMD is arranged before the BIMD is that the derivation processing of the intra prediction mode by the DIMD including the calculation of the histogram is not lighter than the derivation of the intra prediction mode by the BIMD, but the intra prediction mode derived by the DIMD may be able to derive the intra prediction mode reflecting the texture such as the edge based on the partition line of the GPM more by the calculation of the histogram than the intra prediction derived by the BIMD, and thus the effect of improving the intra prediction performance is considered to be likely to be high.

In the configuration example 6, the TIMD is arranged before the BIMD. The reason for the arrangement is the same as the reason for arranging the DIMD before the BIMD.

The configuration example 7 is a configuration example in which all of the GIMD, the DIMD, the TIMD, and the BIMD are combined, and it can be expected that the intra prediction mode with higher prediction performance can be more efficiently derived by deriving the intra prediction mode in this order for the above-described reason.

(Start Restriction of Each Intra Prediction Mode Derivation Method)

The synthesis unit 205 according to the present embodiment starts each derivation processing in a case where the number of intra prediction mode candidates included in the intra prediction mode candidate list has not reached a maximum value of the intra prediction mode candidate list size at the start of each derivation processing of the intra prediction modes for the geometric block partitioning mode described above, and does not start each derivation processing when the number of intra prediction mode candidates has reached the maximum value of the intra prediction mode candidate list size.

According to such a configuration, execution of unnecessary intra prediction mode derivation processing can be avoided, and reduction of the entire processing load of the synthesis unit 205 can be expected.

(Method for Registering Intra Prediction Mode Candidate List After Completion of Intra Prediction Mode Derivation)

The synthesis unit 205 according to the present embodiment may be configured not to register a predetermined intra prediction mode in a case where the same prediction mode has been already included in the intra prediction mode candidate list in a case where the number of intra prediction mode candidates included in the intra prediction mode candidate list has not reached the maximum value of the intra prediction mode candidate list size at the completion of the derivation processing of the intra prediction mode for the geometric block partitioning mode described above.

For example, in configuration examples 1 to 7, in a case where the intra prediction mode derived by DIMD, TIMD, or BIMD and the subsequent Parallel (or Perpendicular) are the same, the list size does not reach the maximum value.

In such a case, the synthesis unit 205 may register an unregistered Perpendicular (or Parallel) mode. Alternatively, the synthesis unit 205 may register the Planar mode. Alternatively, the synthesis unit 205 may register a DC mode. Alternatively, the synthesis unit 205 may register an intra prediction mode near the intra prediction mode initially registered in the intra prediction mode candidate list.

(Method for Storing Prediction Information for Multiple Line Segment Partitioning Mode)

The intra prediction unit 204 stores the intra prediction mode applied to the small region A or the small region B divided in the multiple line segment partitioning mode in units of sub-blocks of a predetermined size obtained by dividing the decoding target block.

The predetermined size may be, for example, the minimum size of the coding block, the prediction block, or the conversion block. Alternatively, the predetermined size may be a fixed size such as 2×2 pixels or 4×4 pixels.

As described above, by storing the intra prediction mode applied to each of the small region A and the small region B not in units of decoding target blocks but in units of sub-blocks, the intra prediction mode in the blending region can be accurately stored.

The intra prediction unit 204 may store both the intra prediction modes of the small region A and the small region B for the sub-block in the blending region. Alternatively, the intra prediction unit 204 may store only the corresponding intra prediction mode depending on which one of the small region A and the small region B the partition line belongs to from the center coordinates of the sub-block.

The motion compensation unit 208 stores the motion information (reference image list, reference image index, motion vector) applied to the small region A or the small region B divided in the multiple line segment partitioning mode in units of sub-blocks of a predetermined size obtained by dividing the decoding target block.

The predetermined size may be, for example, the minimum size of the coding block, the prediction block, or the conversion block. Alternatively, the predetermined size may be a fixed size such as 2×2 pixels or 4×4 pixels.

As described above, by storing the motion information applied to each of the small region A and the small region B not in units of decoding target blocks but in units of sub-blocks, the motion information in the blending region can be accurately stored.

The motion compensation unit 208 may store both the motion information of the small region A and the small region B for the sub-block in the blending region. Alternatively, the motion compensation unit 208 may store only the corresponding motion information depending on which one of the small region A and the small region B the partition line belongs to from the center coordinates of the sub-block.

Alternatively, in a case where the reference image lists of the small region A and the small region B are different from each other (that is, in a case where one frame refers to a frame having a different future direction as viewed from the frame, and the other frame refers to a frame having a different past direction as viewed from the frame), the motion compensation unit 208 may generate and store a new motion vector by performing weighted averaging on each motion vector according to the distance between the frame and each reference frame as in bi-prediction disclosed in Non Patent Literature 1.

Alternatively, in a case where the reference image lists of the small region A and the small region B are the same (that is, in a case where one frame refers to a frame having a different future direction (or past direction) as viewed from the frame, and the other frame refers to a frame having a different future direction (or past direction) as viewed from the frame), the motion compensation unit 208 may store only the motion vector of the small region B. Alternatively, in the same case, the motion compensation unit 208 may store only the small region A.

(Method for Sorting Code Order of Mode Indexes of Multiple Line Segment Partitioning Mode)

The synthesis unit 205 may sort the multiple line segment partitioning modes associated with the decoded value of the control information cu_div_idx for specifying the multiple line segment partitioning mode by the template matching disclosed in Non Patent Literature 2.

Specifically, in a case where the multiple line segment partitioning mode is configured by inter prediction, the synthesis unit 205 compares the errors (for example, SAD: Sum of Absolute Difference) of the adjacent pixels (templates) of the decoding target block and the reference block for all the multiple line segment partitioning modes. When calculating the SAD, the synthesis unit 205 performs weighting and averaging in a form in which the partition line extends to the adjacent pixel.

In a case where the multiple line segment partitioning mode is configured by intra prediction, the synthesis unit 205 generates an adjacent pixel by applying the intra prediction mode to a reference pixel one line or more ahead of the adjacent reference pixel of the decoding target block, and compares the SAD of the generated adjacent pixel and the SAD of the adjacent pixel of the decoding target block.

The synthesis unit 205 sorts the multiple line segment partitioning modes associated with the decoded value of cu_div_idx in ascending order of the SADs by the comparison of the SADs, so that the multiple line segment partitioning mode with high prediction accuracy can be used with a smaller decoded value (code length), and as a result, an effect of improving the encoding efficiency can be obtained.

Furthermore, the synthesis unit 205 may not only sort the multiple line segment partitioning modes associated with the decoded value of cu_div_idx in ascending order of the SADs, but also exclude the multiple line segment partitioning modes from the selectable candidates when the number of the multiple line segment partitioning modes reaches a predetermined number in ascending order of the SADs.

For example, as the predetermined number, the number of candidates that is half of the selectable multiple line segment partitioning mode or the number of candidates that is half of the total number obtained by adding the multiple line segment partitioning mode to the geometric partitioning mode may be set.

As a result, since the multiple line segment partitioning mode associated with cu_div_idx and the number of candidates of the partitioning mode are reduced, further code length shortening of cu_div_idx can be expected, and as a result, an effect of improving the encoding efficiency can be obtained.

According to the image decoding device 200 of the present embodiment, since decoding is performed by dividing each unit block into small regions each including a plurality of line segments, encoding efficiency can be improved.

Modified Example

Note that, in the above-described embodiment, a case where the region is divided into two small regions by a plurality of line segments has been exemplified. However, the present invention is not limited to such a case, and can also be applied to a case where the region is divided into three or more small regions by a plurality of line segments.

Furthermore, in the above-described embodiment, the case where all the small regions are divided so as to include the sides of the decoding target block is exemplified, but the present invention is not limited to such a case, and can also be applied to a case where at least one small region is divided so as not to include the sides of the decoding target block (that is, a case where at least one small region is divided so as not to be in contact with the outer periphery of the decoding target block).

The above-described image decoding device 200 may be implemented as a program that causes a computer to execute each function (each step).

According to the present embodiment, for example, comprehensive improvement in service quality can be realized in moving image communication, and thus, it is possible to contribute to the goal 9 "Build resilient infrastructure, promote inclusive and sustainable industrialization and foster innovation" of the sustainable development goal (SDGs) established by the United Nations.

The invention claimed is:

1. An image decoding device comprising a circuit, wherein the circuit:
- decodes control information and a quantized value;
- performs inverse quantization on the quantized value to obtain a transformation coefficient;
- performs inverse transformation on the transformation coefficient to obtain a prediction residual;
- generates a first prediction pixel based on a decoded pixel and the control information;
- accumulates the decoded pixel;
- generates a second prediction pixel based on the accumulated decoded pixel and the control information;
- synthesizes an arbitrary combination including at least one of the first predicted pixel and the second predicted pixel with each of small regions of a decoding target block divided by a plurality of line segments based on the control information to obtain a third predicted pixel; and
- adds one of the first predicted pixel, the second predicted pixel, and the third predicted pixel and the prediction residual to obtain the decoded pixel,
- wherein the plurality of line segments dividing the decoding target block are continuous with each other and extend in mutually different directions.

2. The image decoding device according to claim 1, wherein the circuit sets a number of the plurality of line segments to a fixed value.

3. The image decoding device according to claim 1, wherein the circuit variably sets a number of the plurality of line segments.

4. The image decoding device according to claim 1, wherein the circuit limits a positional relationship among the plurality of line segments.

5. The image decoding device according to claim 1, wherein the circuit limits angles of the plurality of line segments.

6. The image decoding device according to claim 1, wherein the circuit limits a first line segment among the plurality of line segments only in a horizontal direction or a vertical direction.

7. The image decoding device according to claim 1, wherein the circuit limits an (n+1)th line segment among the plurality of line segments only in a direction perpendicular to an nth line segment among the plurality of line segments.

8. The image decoding device according to claim 1, wherein the circuit limits such that an arrangement that can be realized by existing block division cannot be selected.

9. The image decoding device according to claim 1, wherein the circuit selects the plurality of line segments from among patterns divided in a horizontal direction and a vertical direction at a plurality of partition points.

10. The image decoding device according to claim 1, wherein the circuit fixedly sets a method for limiting the plurality of line segments.

11. The image decoding device according to claim 1, wherein the circuit variably sets a method for limiting the plurality of line segments.

12. The image decoding device according to claim 1, wherein the circuit sets a different method for limiting the plurality of line segments according to a size of the decoding target block.

13. The image decoding device according to claim 1, wherein the circuit arranges partition points of the small region for each constant pixel.

14. The image decoding device according to claim 1, wherein the circuit fixedly sets a number of partition points regardless of a size of the decoding target block by changing an arrangement of the partition points of the small region.

15. The image decoding device according to claim 1, wherein the circuit applies a common weighted average to the plurality of line segments when performing weighted averaging on each of predicted pixels for a first small region and a second small region of the decoding target block divided by the plurality of line segments according to distances from the plurality of line segments.

16. The image decoding device according to claim 1, wherein the circuit applies a different weighted average to each of the plurality of line segments when performing weighted averaging on each of predicted pixels for a first small region and a second small region of the decoding target block divided by the plurality of line segments according to distances from the plurality of line segments.

17. The image decoding device according to claim 15, wherein the circuit selects a weighting factor from among a plurality of weighting factors according to at least one of a length of a short side, a length of a long side, a size, or an aspect ratio of the decoding target block, or a type of a partitioning mode.

18. The image decoding device according to claim 15, wherein the circuit selects a weighting factor from among a plurality of weighting factors according to a type of an intra prediction mode.

19. The image decoding device according to claim 15, wherein the circuit selects a weighting factor from among a plurality of weighting factors according to a size of the first small region or the second small region.

20. The image decoding device according to claim 15, wherein the circuit selects a weighting factor from among a plurality of weighting factors according to a number of pixels of the plurality of line segments.

21. The image decoding device according to claim 15, wherein in a case where a direction of the plurality of line segments is a horizontal direction or a vertical direction with respect to the decoding target block, the circuit selects a weighting factor from among a plurality of weighting factors according to a ratio between a direction of the plurality of line segments and a side of the decoding target block in the same direction.

22. The image decoding device according to claim 15, wherein the circuit uses a newly generated weighting factor by selecting a minimum value of each element of a weighting factor for each of the plurality of line segments.

23. The image decoding device according to claim 15, wherein the circuit uses a newly generated weighting factor by calculating a product of respective elements of the weighting factor for each of the plurality of line segments.

24. The image decoding device according to claim 1, wherein the circuit derives an intra prediction mode according to DIMD using only a region of a reference pixel facing across a left or upper block boundary of the decoding target block with respect to a first small region or a second small region.

25. The image decoding device according to claim 1, wherein the circuit derives an intra prediction mode according to DIMD using all reference pixels in a case where there is no region of a reference pixel facing across a left or upper block boundary of the decoding target block with respect to a first small region or a second small region.

26. The image decoding device according to claim 1, wherein the circuit derives an intra prediction mode according to TIMD using only a region of a reference pixel facing across a left or upper block boundary of the decoding target block with respect to a first small region or a second small region.

27. The image decoding device according to claim 1, wherein the circuit derives an intra prediction mode according to TIMD using all reference pixels in a case where there is no region of a reference pixel facing across a left or upper block boundary of the decoding target block with respect to a first small region or a second small region.

28. The image decoding device according to claim 1, wherein the circuit applies a table of a region of an adjacent reference pixel defined based on a partition line of a partitioning mode of the plurality of line segments to reference an adjacent reference block of BIMD.

29. The image decoding device according to claim 1, wherein the circuit selects an intra prediction mode to be actually applied from a plurality of different intra prediction mode candidates included in an intra prediction mode candidate list.

30. An image decoding method comprising:

decoding control information and a quantized value;

performing inverse quantization on the quantized value to obtain a transformation coefficient;

performing inverse transformation on the transformation coefficient to obtain a prediction residual;

generating a first prediction pixel based on a decoded pixel and the control information;

accumulating the decoded pixel;

generating a second prediction pixel based on the accumulated decoded pixel and the control information;

synthesizing an arbitrary combination including at least one of the first predicted pixel and the second predicted pixel with each of small regions of a decoding target block divided by a plurality of line segments based on the control information to obtain a third predicted pixel; and adding one of the first predicted pixel, the second predicted pixel, and the third predicted pixel and the prediction residual to obtain the decoded pixel, wherein the plurality of line segments dividing the decoding target block are continuous with each other and extend in mutually different directions.

31. A program stored on a non-transitory computer-readable medium causing a computer to function as an image decoding device including a circuit, wherein the circuit:

decodes control information and a quantized value;

performs inverse quantization on the quantized value to obtain a transformation coefficient;

performs inverse transformation on the transformation coefficient to obtain a prediction residual;

generates a first prediction pixel based on a decoded pixel and the control information;

accumulates the decoded pixel;

generates a second prediction pixel based on the accumulated decoded pixel and the control information;

synthesizes an arbitrary combination including at least one of the first predicted pixel and the second predicted pixel with each of small regions of a decoding target block divided by a plurality of line segments based on the control information to obtain a third predicted pixel; and adds one of the first predicted pixel, the second predicted pixel, and the third predicted pixel and the prediction residual to obtain the decoded pixel, wherein the plurality of line segments dividing the decoding target block are continuous with each other and extend in mutually different directions.

* * * * *